(12) United States Patent
Yamazaki

(10) Patent No.: US 12,175,238 B2
(45) Date of Patent: Dec. 24, 2024

(54) STORAGE MEDIUM, INFORMATION PROCESSING APPARATUS, CONTROL METHOD, AND SYSTEM

(71) Applicant: CANON KABUSHIKI KAISHA, Tokyo (JP)

(72) Inventor: Shinya Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 18/051,793

(22) Filed: Nov. 1, 2022

(65) Prior Publication Data

US 2023/0146770 A1 May 11, 2023

(30) Foreign Application Priority Data

Nov. 5, 2021 (JP) .................................. 2021-181101

(51) Int. Cl.
  *G06F 9/445* (2018.01)
  *G06F 8/61* (2018.01)
  *G06F 8/71* (2018.01)

(52) U.S. Cl.
  CPC . *G06F 8/71* (2013.01); *G06F 8/61* (2013.01)

(58) Field of Classification Search
  CPC ..... G06F 8/71; G06F 8/61; G06F 8/65; G06F 8/60; G06F 40/197
  USPC .................................................. 717/169–178
  See application file for complete search history.

(56) References Cited

U.S. PATENT DOCUMENTS

| | | | | |
|---|---|---|---|---|
| 2021/0263711 A1* | 8/2021 | Douglas | ............ | G06F 8/36 |
| 2021/0263719 A1* | 8/2021 | Pai | ............ | H04L 9/0637 |
| 2021/0263791 A1* | 8/2021 | Goodsitt | ........ | G06Q 10/063118 |

FOREIGN PATENT DOCUMENTS

JP 2019164736 A 9/2019

* cited by examiner

*Primary Examiner* — Chuck O Kendall
(74) *Attorney, Agent, or Firm* — Canon U.S.A., Inc. IP Division

(57) ABSTRACT

An information processing apparatus capable of acquiring information about a communication apparatus capable of communicating with the information processing apparatus performs a first execution step of, based on the information processing apparatus being capable of executing a timing notification function, causing the information processing apparatus to execute the timing notification function, and a second execution step of, based on the information processing apparatus being incapable of executing the timing notification function, causing the information processing apparatus to execute an immediate notification function, wherein the timing notification function is a function of, based on it being determined that the information about the communication apparatus satisfies an output condition, causing a notification that is based on the notification information to be output, and wherein the immediate notification function is a function of, without based on the information about the communication apparatus, causing the notification to be output.

20 Claims, 15 Drawing Sheets

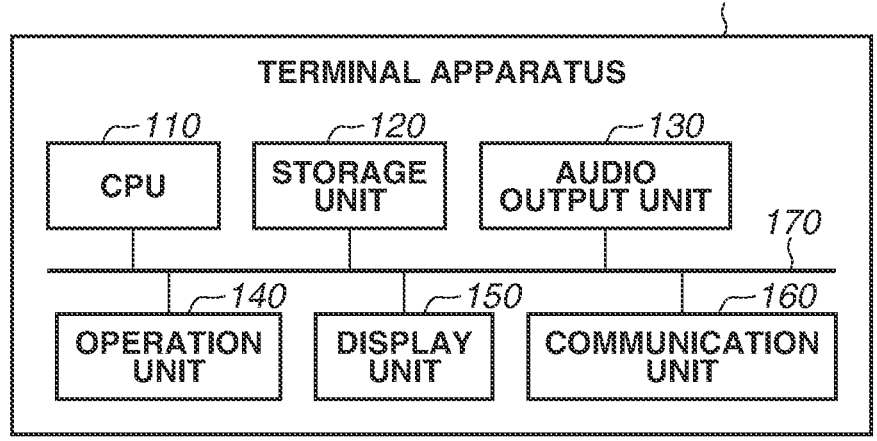
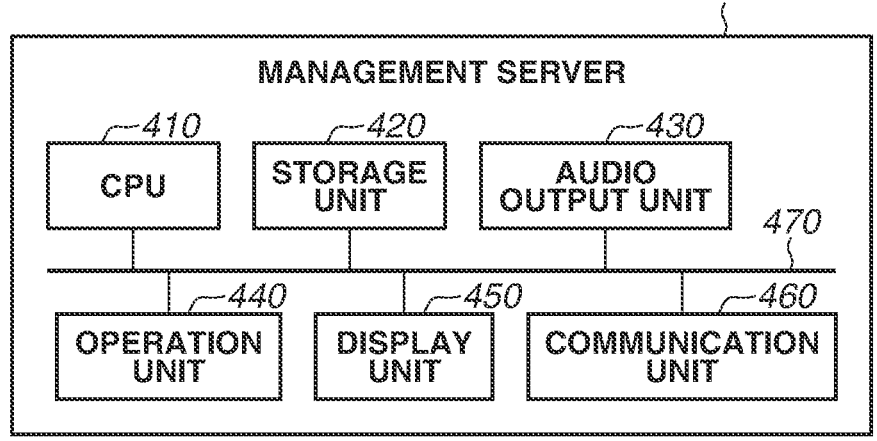
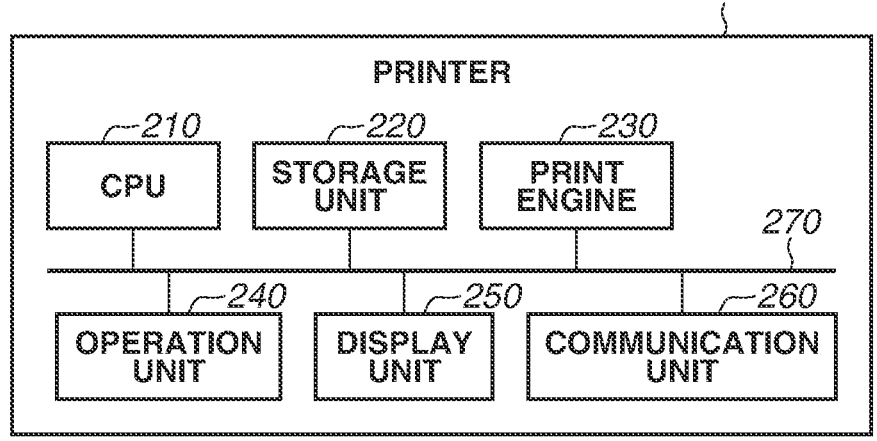

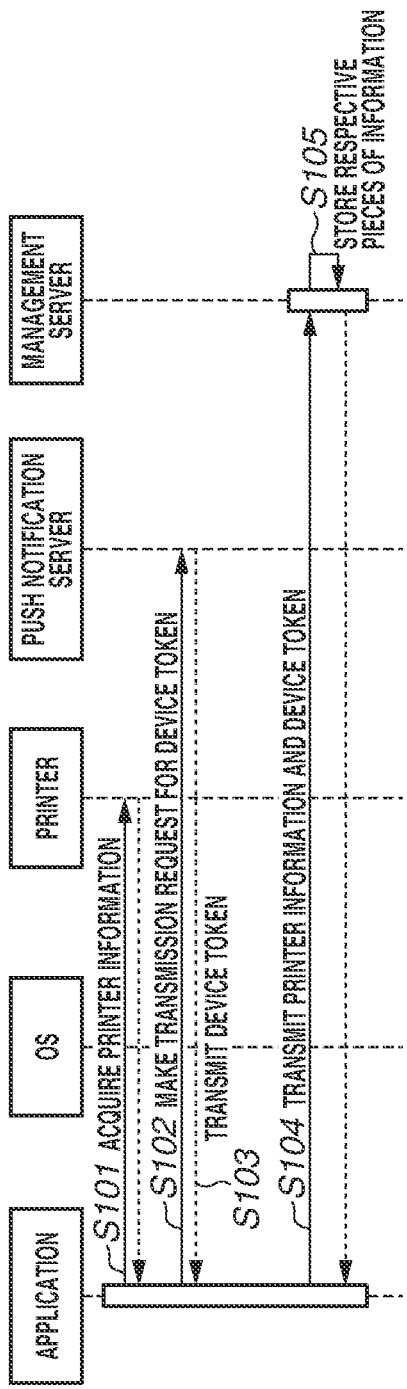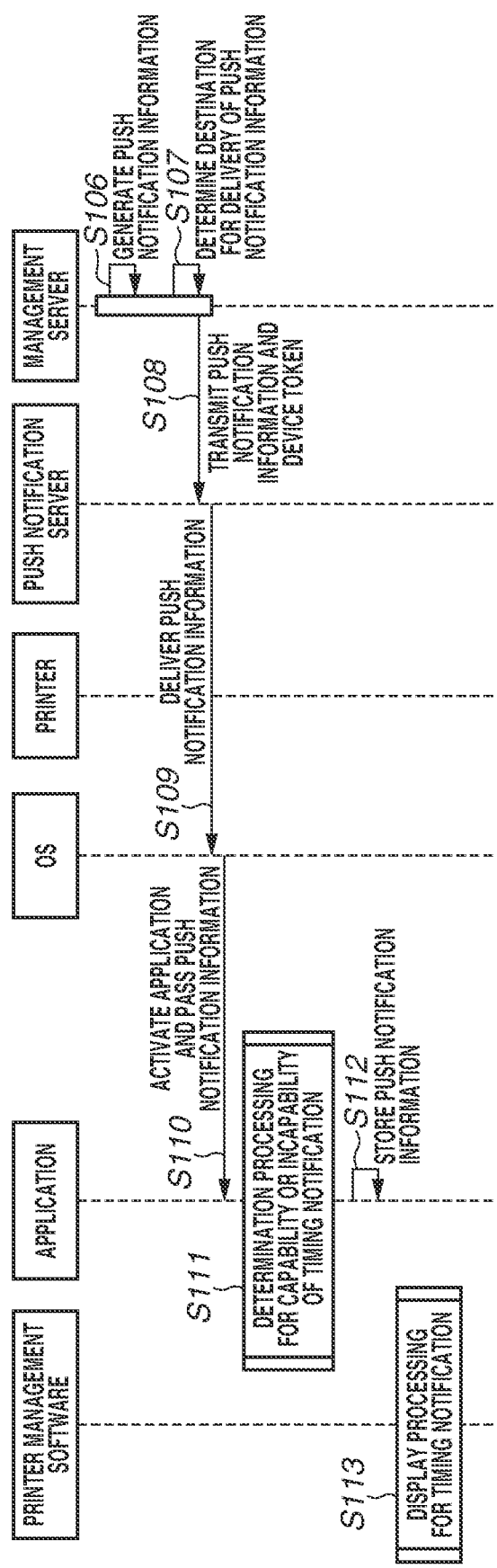

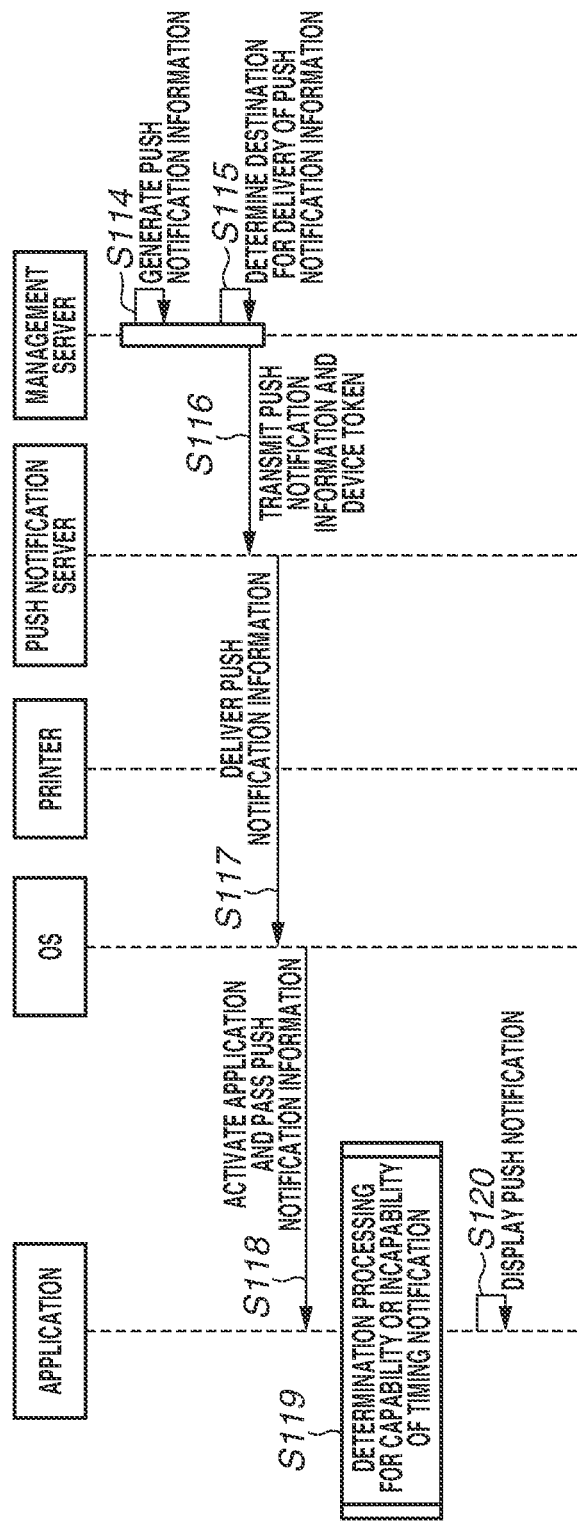

FIG.4

| | | |
|---|---|---|
| MESSAGE: | Ink discount campaign in progress! | ~401 |
| DISPLAY URL: | https://www.hegehogexxx.com/campaign/index.html | ~402 |
| EXPIRATION DATE OF NOTIFICATION: | December 1, 2021 0:00 | ~403 |
| MODEL TARGETED FOR DELIVERY OF NOTIFICATION: | ☑ AAA Printer<br>☑ BBB Printer<br>☐ CCC Printer<br>☐ DDD Printer | ~404 |
| DISPLAY CONDITION FOR NOTIFICATION: | In case of issuance of warning of small ink remaining amount | ~405 |
| | ☑ Immediately issue a notification in a case where it is impossible to determine the display condition.<br>406 | |
| | REGISTRATION ~407 | |

FIG.5

```
{
  "message": "Ink discount campaign in progress!",
  "campaignURL": "https://www.hegehogexxx.com/campaign/index.html",
  "expireDate": "2021/12/01 0:00",
  "condition": "error_code:InkLow",
  "notification_switch": "ON",
}
```

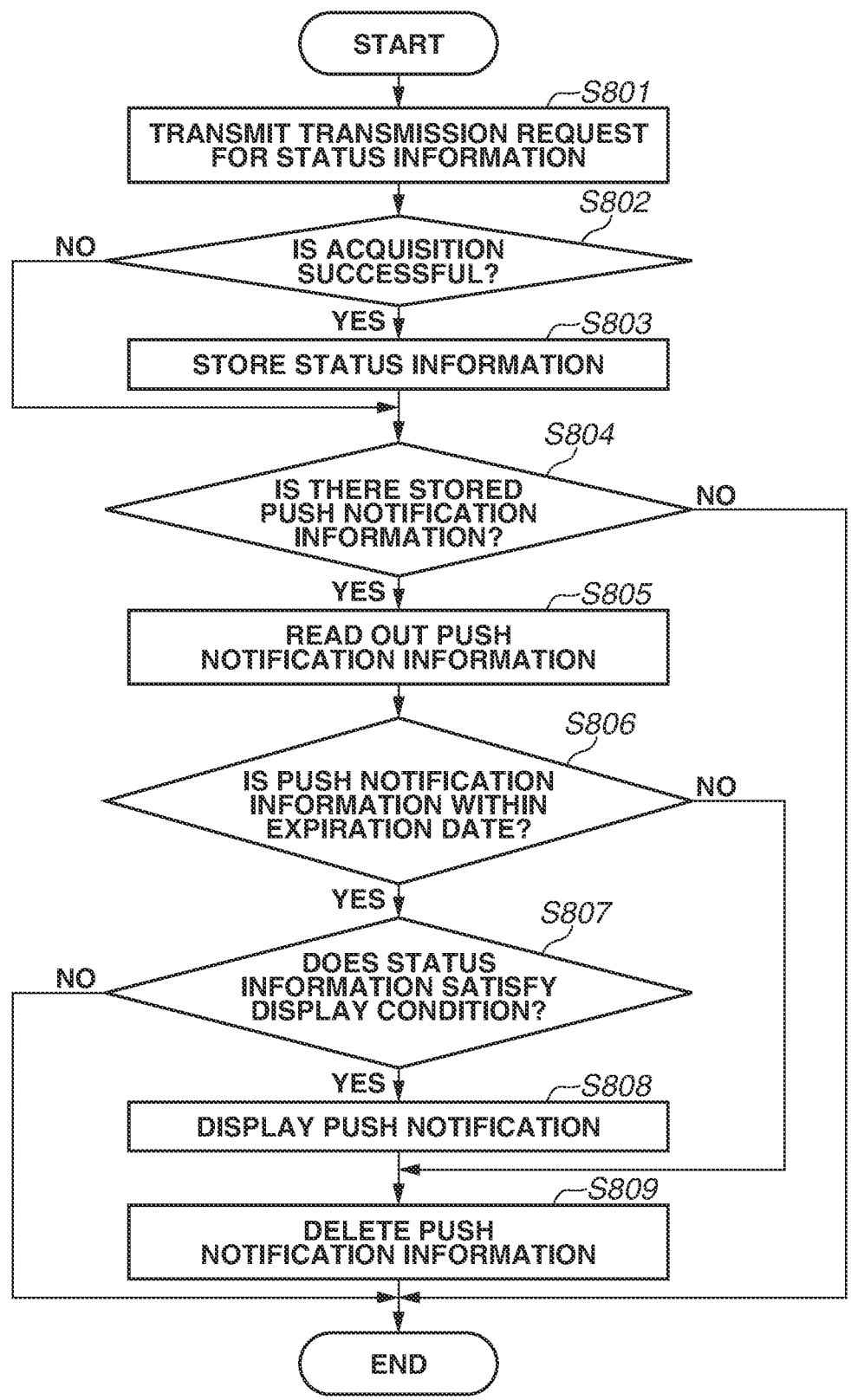

FIG.9

| STATUS | DETAILED STATUS | VALUE |
|---|---|---|
| IDLE STATE IN PROGRESS | WARNING OF SMALL INK REMAINING AMOUNT | Idle:InkLow |
| | WARNING OF SMALL PAPER REMAINING AMOUNT | Idle:PaperLow |
| PRINTING IN PROGRESS | WARNING OF SMALL INK REMAINING AMOUNT | Printing:InkLow |
| | WARNING OF SMALL PAPER REMAINING AMOUNT | Printing:PaperLow |
| INK REPLACEMENT IN PROGRESS | — | InkChange |
| ERROR IN PROGRESS | MAIN BODY COVER OPENING | Error:CoverOpen |
| | BATTERY FAILURE ERROR | Error:BatteryErr |

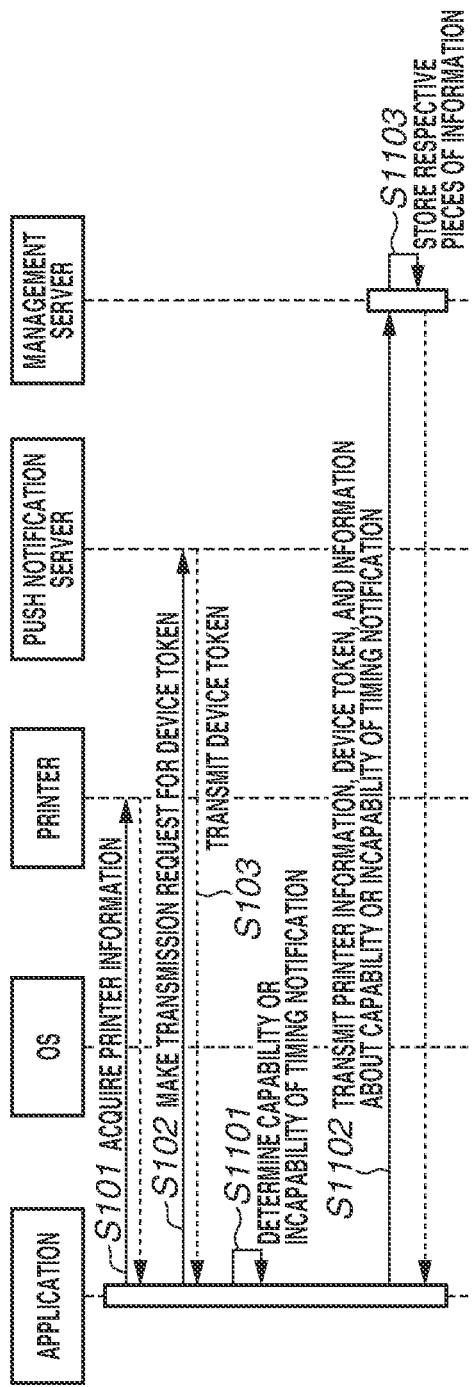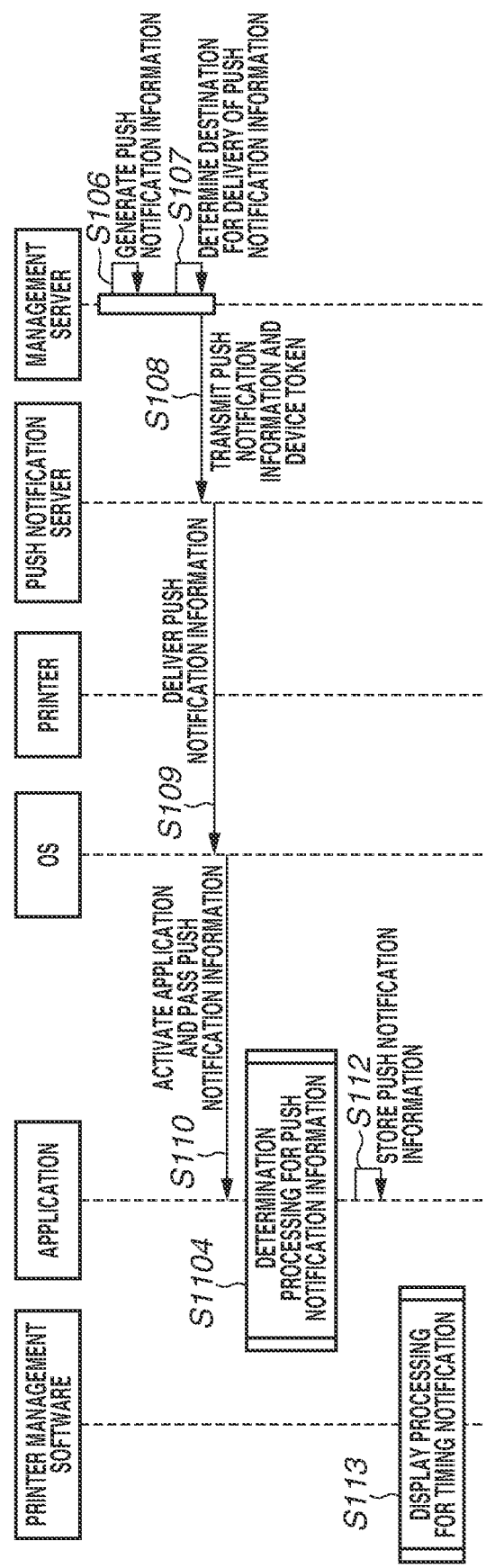

FIG.11A

```
{
  "message": "Ink discount campaign in progress!",
  "campaignURL": "https://www.hegehogexxx.com/campaign/index.html",
  "expireDate": "",
  "condition": "",
  "notification_switch": "",
}
```

FIG.11B

```
{
  "message": "There is updating of software.",
  "campaignURL": "https://www.hegehogexxx.com/download/software.html",
  "expireDate": "",
  "condition": "",
  "notification_switch": "",
}
```

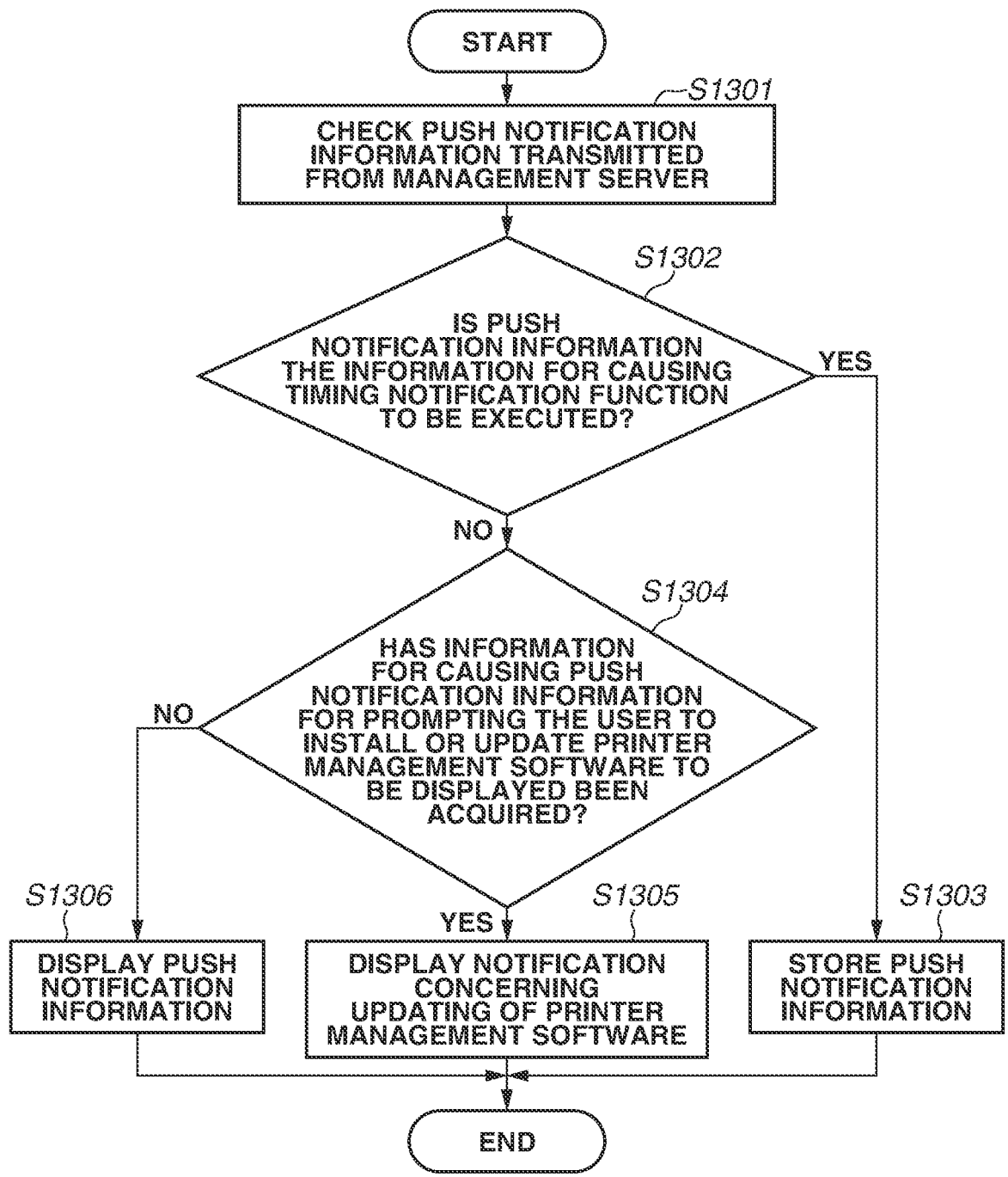

STORAGE MEDIUM, INFORMATION PROCESSING APPARATUS, CONTROL METHOD, AND SYSTEM

BACKGROUND

Field of the Disclosure

Aspects of the present disclosure generally relate to a storage medium, an information processing apparatus, a control method, and a system.

Description of the Related Art

There is known a technique of, to provide information to the user, notifying a terminal apparatus of the information at appropriate timing. For example, Japanese Patent Application Laid-Open No. 2019-164736 discusses a technique of determining appropriate timing of notification of information based on a learning model which has been trained on timing for issuing a notification of information with respect to a specific behavior of the user.

However, for example, in the method of determining notification timing for information according to a specific behavior of the user, such as that discussed in Japanese Patent Application Laid-Open No. 2019-164736, it is impossible to output a notification at timing corresponding to information about a communication apparatus that is not a terminal apparatus which performs notification. Furthermore, while there is a timing notification function which is a function of outputting a notification at timing corresponding to information about a printer, there is an issue in which an apparatus that is not a terminal apparatus capable of executing the timing notification function is not able to output a notification at timing corresponding to information about the printer.

SUMMARY

Aspects of the present disclosure are generally directed to enabling, when notifying a terminal apparatus of information, issuing a notification of the information at timing appropriate for the user.

Embodiments of the present disclosure include a non-transitory computable-readable storage medium storing one or more programs including instructions, which when executed by one or more processors of an information processing apparatus, cause the one or more processors to perform a first execution step of, based on the information processing apparatus, which is capable of acquiring information about a communication apparatus capable of communicating with the information processing apparatus, being capable of executing a timing notification function, causing the information processing apparatus to execute the timing notification function, and a second execution step of, based on the information processing apparatus being incapable of executing the timing notification function, causing the information processing apparatus to execute an immediate notification function, wherein the timing notification function is a function of determining whether the information about the communication apparatus satisfies an output condition corresponding to information included in notification information and, based on it being determined that the information about the communication apparatus satisfies the output condition, causing a notification that is based on the notification information to be output, and wherein the immediate notification function is a function of, without based on the information about the communication apparatus, causing a notification that is based on the notification information to be output.

Further features of the present disclosure will become apparent from the following description of exemplary embodiments with reference to the attached drawings.

BRIEF DESCRIPTION OF THE DRAWINGS

FIGS. 2A, 2B, and 2C are diagrams illustrating configurations of a terminal apparatus, a management server, and a printer, respectively.

FIGS. 3A, 3B, and 3C are sequence diagrams of the system.

FIG. 4 is a diagram illustrating a screen for performing setting of push notification information.

FIG. 5 is a diagram illustrating information about a push notification.

FIG. 8 is a flowchart illustrating display processing for a notification that is based on push notification information.

FIG. 9 is a diagram illustrating status information about the printer.

FIGS. 10A, 10B, and 10C are sequence diagrams of the system.

FIGS. 11A and 11B are diagrams illustrating information about push notifications.

FIG. 13 is a flowchart illustrating display processing for a notification that is based on push notification information.

DESCRIPTION OF THE EMBODIMENTS

Various exemplary embodiments, features, and aspects of the present disclosure will be described in detail below with reference to the drawings. Furthermore, the following exemplary embodiments should not be construed to limit the present disclosure, and not all of the combinations of features described in the exemplary embodiments are necessarily essential for solutions in the present disclosure. Moreover, in the accompanying drawings, the same or similar constituent elements are assigned the respective same reference numbers, and any duplicate description thereof is omitted.

Figure 1:
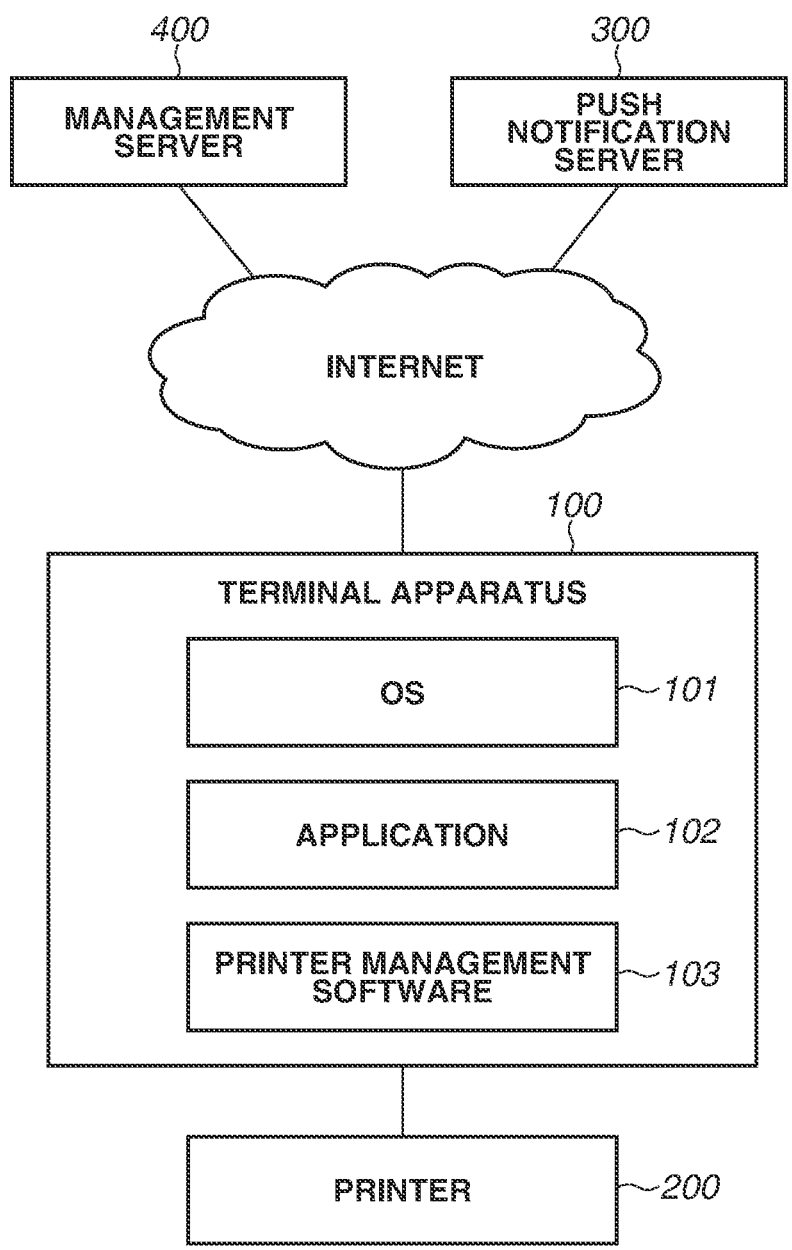
FIG. 1 is a diagram illustrating a configuration of a system.

FIG. 1 is a diagram illustrating a configuration of a system in a first exemplary embodiment. The system in the first exemplary embodiment includes a terminal apparatus 100, a communication apparatus 200, a push notification server 300, and a management server 400. Furthermore, the terminal apparatus 100 is an information processing apparatus with an operating system (hereinafter referred to as an "OS") 101 and an application program (hereinafter referred to as an "application") 102 installed thereon.

In the system illustrated in FIG. 1, the respective devices are interconnected in such a way as to communicate with each other. For example, a communication method for use in connection between the terminal apparatus 100 and the communication apparatus 200 is, for example, a communication standard in the IEEE 802.11 series (Wi-Fi) or Bluetooth (such as Bluetooth Classic or Bluetooth Low Energy (BLE)). Moreover, the terminal apparatus 100 and the communication apparatus 200 can be interconnected via a Universal Serial Bus (USB) cable. Furthermore, a configuration in which direct connection is not performed between the terminal apparatus 100 and the communication apparatus 200 can be employed. Specifically, for example, the terminal apparatus 100 and the communication apparatus 200 can be interconnected via a network built out by an access point. Moreover, the terminal apparatus 100 and the communication apparatus 200 can be connected to a base station by mobile communication (3G, 4G, or 5G) and perform communication by the Internet communication using the base station. Moreover, the terminal apparatus 100 and the push notification server 300 or the management server 400, which is outside the terminal apparatus 100, are interconnected via the Internet in such a way as to be able to communicate with each other. Additionally, the management server 400 and the push notification server 300 are interconnected via the Internet in such a way as to be able to communicate with each other.

The terminal apparatus 100 is, for example, an information processing apparatus such as a personal computer (PC) or a smartphone. Any type of device such as a digital camera can be applied as the terminal apparatus 100 in the first exemplary embodiment. Moreover, the communication apparatus 200 is, for example, a printing apparatus (hereinafter referred to as a "printer") 200. The printing method in the printer 200 can be an electrophotographic method or an inkjet method or can be any other type.

The management server 400 is an information processing apparatus having a function of generating push notification information and managing to which terminal apparatus to transmit the push notification information, and the details of the management server 400 are described below with reference to FIGS. 3A, 3B, and 3C.

The push notification server 300 is an information processing apparatus having a function of delivering push notification information to the terminal apparatus 100, and the details thereof are described below with reference to FIGS. 3A, 3B, and 3C.

FIG. 2A is a diagram illustrating a configuration of hardware of the terminal apparatus 100. The terminal apparatus 100 is configured to include a central processing unit (CPU) 110, a storage unit 120, an audio output unit 130, an operation unit 140, a display unit 150, and a communication unit 160. Then, the respective units of the terminal apparatus 100 are connected to each other via a system bus 170.

The operation unit 140 receives an operation performed by the user. For example, the operation unit 140 is configured with, for example, a mouse, a keyboard, or a touch panel. The audio output unit 130 outputs sound. For example, the audio output unit 130 is configured with, for example, a loudspeaker, and outputs the content of push notification information by sound. The display unit 150 displays an image or information. For example, the display unit 150 is configured with a screen such as a liquid crystal display and outputs the content of push notification information by performing displaying on the screen such as a liquid crystal display. The communication unit 160 performs communication with another apparatus. For example, the communication unit 160 is configured with, for example, a USB interface, a wired local area network (LAN) interface, or a wireless LAN interface and performs communication with the printer 200, the push notification server 300, or the management server 400. The storage unit 120 is configured with, for example, a read-only memory (ROM) or a random access memory (RAM), stores various pieces of data and various programs, and is used as a work area for use in executing various programs and a temporary storage region for data. Examples of the data to be stored in the storage unit 120 include the OS 101, the application 102, and the printer management software 103. In the following description, an application for causing the printer 200 to perform printing is described as an example of the application 102. Furthermore, the application 102 can be an application for activating a plurality of applications different from the application 102, or can be an application for displaying status information about the printer 200. Moreover, the printer management software 103 is software capable of acquiring information about the status of the printer 200 (hereinafter referred to as "status information") from the printer 200 and displaying the status information on the screen of the terminal apparatus 100, and, in the first exemplary embodiment, is a status monitor. Moreover, although described below, in some cases, the printer management software 103 is not installed on the terminal apparatus 100. Furthermore, software other than the OS 101 and the application 102 can be additionally stored in the storage unit 120. For example, the software considered to be additionally stored includes a drawing application for generating image data or a printer driver (print data generation software) for generating print data based on the generated image data.

FIG. 2B is a diagram illustrating a configuration of hardware of the management server 400. The management server 400 is configured to include a CPU 410, a storage unit 420, an audio output unit 430, an operation unit 440, a display unit 450, and a communication unit 460. Then, the respective units of the management server 400 are connected to each other via a system bus 470. Furthermore, the respective constituent units of the management server 400 have functions similar to the respective constituent units of the terminal apparatus 100.

Furthermore, the management server 400 is capable of communicating with a management PC which is an information processing apparatus of the administrator, and, when setting of push notification information or inputting of information described below is performed on the management PC, the setting information for push notification information or the input information is transmitted to the management server 400. Then, push notification information is generated by the management server 400 based on the setting information. Therefore, in the first exemplary embodiment, in the following description, the push notification information is assumed to be generated by the management server 400.

FIG. 2C is a diagram illustrating a configuration of hardware of the printer 200. The printer 200 is configured to include a CPU 210, a storage unit 220, a print engine 230, an operation unit 240, a display unit 250, and a communication unit 260. Then, the respective units of the printer 200 are connected to each other via a system bus 270. The print engine 230 forms an image on a recording medium such as paper by applying a recording agent such as ink to the recording medium based on information stored in the storage unit 220 or a print job received from, for example, the terminal apparatus 100, and thus outputs a printed result. Furthermore, the other constituent units of the printer 200 have functions similar to the respective constituent units of the terminal apparatus 100.

Furthermore, the hardware configuration of the management PC in the first exemplary embodiment is the same as the hardware configuration of the terminal apparatus 100 illustrated in FIG. 2A. The hardware configuration of the push notification server 300 in the first exemplary embodiment is also the same as the hardware configuration of the management server 400 illustrated in FIG. 2B. In the following description, an example in which each of the management server 400 and the push notification server 300 in the first exemplary embodiment is configured with a single server apparatus (information processing apparatus) is described. However, a configuration in which a function to be executed by each server is executed by a plurality of servers on the cloud operating in association with each other can be employed. Thus, each of the management server 400 and the push notification server 300 can be configured with a plurality of server apparatuses. A server configured with one server apparatus or a plurality of server apparatuses is also referred to as a "server system".

Here, a push notification function is described. The push notification function is a function included in the OS and is a function of displaying a notification content indicated by push notification information transmitted from the push notification server 300 with use of a push notification region. Furthermore, the push notification region can be a notification region such as Toast, Notification, Snackbar, or Dialog in Android. In the first exemplary embodiment, a notification of information about a service or campaign related to the application 102 operating on the terminal apparatus 100 by the push notification function is assumed to be issued. Furthermore, a notification of the other content can be issued.

Moreover, here, an immediate notification function is described. The immediate notification function is a function in which the push notification function is executed without based on status information about the printer 200, and is assumed to include an immediate notification function A and an immediate notification function B. The immediate notification function A is a function included in the application 102 or the printer management software 103 and is a function of causing the OS 101 to immediately display, on the screen of the terminal apparatus 100 by the push notification function, a notification that is based on push notification information received from the OS 101.

Next, the immediate notification function B is described. The immediate notification function B is a function included in the OS 101 and is a function of causing the OS 101 to, without passing push notification information to the application 102 or the printer management software 103, immediately display a notification that is based on the received push notification information by the push notification function.

Additionally, here, a timing notification function, which is a function of the printer management software 103, is described. In the first exemplary embodiment, the timing notification function is a function of causing the OS 101 to display a notification that is based on push notification information on the screen of the terminal apparatus 100 by the push notification function in a case where the state of the printer 200 connected to the terminal apparatus 100 has satisfied a display (output) condition designated by the push notification information. The flow of processing leading to the printer management software 103 executing the timing notification function is described. First, the application 102 acquires push notification information generated by the management server 400, and stores the push notification information in the storage unit 120. Moreover, the printer management software 103 acquires status information about the printer 200 as appropriate from the printer 200, and stores the status information in the storage unit 120. After that, the printer management software 103 acquires status information about the printer 200 and push notification information from the storage unit 120, and determines whether the status information about the printer 200 satisfies a display condition corresponding to information included in the push notification information. Then, if it is determined that the status information about the printer 200 satisfies a display condition corresponding to information included in the push notification information, the printer management software 103 instructs the OS 101 to output a notification that is based on the push notification information, so that a push notification region is output by the OS 101. This causes the push notification region to be displayed at timing needed for the user.

Furthermore, it is favorable that the management server 400 causes a specific tag to be included in push notification information and causes the OS 101 to refer to the specific tag. Thus, the OS 101 can switch between whether to issue a notification that is based on the received push notification information with use of the immediate notification function B and whether to execute any one of the immediate notification function A and the timing notification function. Specifically, in a case where the specific tag is included in push notification information, the OS 101 passes the push notification information to the application 102 in step S110 described below. On the other hand, in a case where the specific tag is not included in push notification information (or in a case where a tag different from the specific tag is included), the OS 101 can execute the immediate notification function B based on the received push notification information without passing the push notification information to the application 102 in step S110. Furthermore, the following description is based on a case were the specific tag is included in push notification information.

However, there is a case where the printer management software 103 is not currently installed on the terminal apparatus 100 or a case where, while the printer management software 103 is currently installed on the terminal apparatus 100, the printer management software 103 is not compatible with the timing notification function. The case where the printer management software 103 is not currently installed on the terminal apparatus 100 is, for example, a case where a printer driver which does not include the printer management software 103 is currently installed on the terminal apparatus 100. Moreover, the case where, while the printer management software 103 is currently installed on the terminal apparatus 100, the printer management software 103 is not compatible with the timing notification function is, for example, a case where a printer driver which includes an old version of the printer management software 103 not including the timing notification function is currently installed on the terminal apparatus 100. In this case, since software for identifying display timing for push notification information is not currently installed on the terminal apparatus 100, a push notification function using the timing notification function is not executed, so that, in some cases, push notification information stored in the storage unit 120 continues not being displayed. As a result, there is a possibility that it is not possible to issue a notification of a content that is based on the push notification information at appropriate timing. Moreover, there is a possibility that it is not possible to notify the user of a content that is based on the push notification information.

Therefore, in the first exemplary embodiment, the application 102 determines whether the printer management software 103 is currently installed on the terminal apparatus 100. Moreover, if it is determined that the printer management software 103 is currently installed on the terminal apparatus 100, the application 102 determines whether the printer management software 103 is compatible with the timing notification function. Then, if it is determined that the printer management software 103 is currently installed on the terminal apparatus 100 and is compatible with the timing notification function, the application 102 performs control in such a manner that the push notification function is executed by the timing notification function. Moreover, if it is determined that the printer management software 103 is not currently installed on the terminal apparatus 100 or if it is determined that the printer management software 103 is not compatible with the timing notification function, the application 102 performs control in such a manner that the push notification function is executed by the immediate notification function A. Furthermore, in a case where it is determined that the printer management software 103 is not currently installed on the terminal apparatus 100, the application 102 does not need to perform determination as to whether the printer management software 103 is compatible with the timing notification function. With this processing, in a case where the timing notification function is executed, it is possible to provide push notification information to the user at appropriate timing. Moreover, even in a case where the timing notification function is not executed, the immediate notification function A is executed, so that it is possible to notify the user of a content that is based on the push notification information.

FIGS. 3A to 3C are sequence diagrams of the present system. While, in the following description, each apparatus, an application, or an OS may be assumed to be the subject of each processing, actually, a processor such as a CPU included in each apparatus executes a corresponding program, thus implementing the corresponding function. Furthermore, not all of the processing operations are always sequentially performed on a single process, and there can be a case where processing once proceeds to the OS 101 and is then invoked from the OS 101 again. The sequence diagrams merely correspond to a flow illustrating principal processing for descriptive purposes and in an easily understandable manner. Furthermore, to perform push notification to the terminal apparatus 100, it is necessary that registration processing for push notification has been performed in advance.

Therefore, first, registration processing for push notification is described. FIG. 3A is a sequence diagram of registration processing for registering the terminal apparatus 100, as a terminal apparatus targeted for delivery of a push notification, with the management server 400.

In step S101, the application 102 acquires printer information from the printer 200. The printer information is attribute information or identification information included in a printer, such as a model name or serial number of the printer. Furthermore, in a case where a plurality of printers is connected, the application 102 can acquire printer information about all of the printers 200 connected to the terminal apparatus 100.

In step S102, the application 102 makes a transmission request for a device token to the push notification server 300. Furthermore, in this request, identification information about the terminal apparatus 100 is transmitted. Here, the device token is identification data (ID) for identifying a terminal apparatus serving as a target to which the push notification server 300 transmits push notification information. Here, the terminal apparatus 100 is assumed to be a terminal apparatus serving as a target to which push notification information is transmitted. Upon receiving a transmission request for a device token from the application 102, the push notification server 300 generates, based on the identification information about the terminal apparatus 100, a device token corresponding to a terminal apparatus serving as a target to which to transmit push notification information. Furthermore, the application 102 knows address information about the push notification server 300 in advance and is, therefore, assumed to be able to communicate with the push notification server 300.

In step S103, the push notification server 300 transmits the generated device token to the application 102.

In step S104, the application 102 transmits the acquired printer information and device token to the management server 400 while associating them with each other. Furthermore, in a case where a plurality of pieces of printer information has been acquired, the application 102 causes the user to select a printer 200 which the user uses from among printers corresponding to the acquired pieces of printer information. For example, the application 102 displays a selection screen for causing the user to select a printer 200 which the user uses. Then, the application 102 transmits printer information about the selected printer 200 and the device token acquired in step S103 to the management server 400 while associating them with each other. Furthermore, the application 102 is assumed to know address information about the management server 400 in advance to communicate with the management server 400.

In step S105, the management server 400 stores the acquired printer information and device token. With this processing, the terminal apparatus 100 is registered with the management server 400 as a terminal apparatus serving as a target to which to deliver a push notification.

Here, setting of push notification information and the push notification information are described. The content of push notification information is determined on a dashboard of the management PC provided by the management server 400. The dashboard is a management screen for a service provider such as the vendor of the printer 200 to set what push notification information to deliver to which terminal apparatus 100, and the service provider is able to perform setting of the content of push notification information on a user interface (UI) screen which is supplied. For example, the service provider performs setting of the content of push notification information with use of a screen illustrated in FIG. 4 described below. Moreover, the service provider is also able to designate, on such a dashboard, which of the immediate notification function A and the timing notification function to execute with respect to push notification information which is transmitted. Moreover, the service provider is also able to designate, on such a dashboard, whether to cause information about the above-mentioned specific tag to be included in push notification information. Thus, the service provider is able to set whether push notification information is displayed by the immediate notification function B being executed or whether push notification information is displayed by any one of the immediate notification function A and the timing notification function being executed.

FIG. 4 is a diagram illustrating a screen for performing setting of push notification information. The screen illustrated in FIG. 4 is provided by the management server 400 and is displayed on the management PC. The service provider performs setting of push notification information and thus causes the management server 400 to determine, for example, what push notification information to deliver to which terminal apparatus 100. For example, a setting item 401 is an item for setting a text to be displayed in a push notification region. Here, as an example, a text of "Ink discount campaign in progress!" is set. A setting item 402 is an item for setting the Uniform Resource Locator (URL) of a web page to be displayed by a browser when the user has selected the displayed push notification information. For example, by selecting the displayed push notification information, the user is able to obtain detailed information related to the content of push notification information based on a web page which is opened from the corresponding URL. A setting item 403 is an item for determining an expiration date of displaying push notification information on the terminal apparatus. Here, as an example, "Dec. 1, 2020 0:00" is set.

A setting item 404 is an item for setting push notification information about which printer to transmit. In the setting item 404, previously selected printers are described, and the service provider puts a check mark to a printer name related to the content of push notification information. For example, the service provider puts a check mark to a printer name for which to use ink subjected to an ink discount campaign in progress indicated by the setting item 401. The management server 400 determines whether the printer name described in the printer information transmitted in step S104 is included in a list of printer names to which a check mark is put in the setting item 404. Then, upon determining that the described printer name is included in a list of printer names to which a check mark is put in the setting item 404, the management server 400 extracts a terminal apparatus identified by the device token associated with the transmitted printer information, as a terminal apparatus serving as a target for delivery of push notification information. Here, as an example, a check mark is put to printer names "AAA Printer" and "BBB Printer". Thus, all of the terminal apparatuses connected to the printers "AAA Printer" and "BBB Printer" are extracted as terminal apparatuses serving as targets for delivery of push notification information. Here, the terminal apparatus extracted as one of terminal apparatuses serving as targets for delivery of push notification information is assumed to be the terminal apparatus 100.

A setting item 405 is an item for setting a display condition for push notification information, and is an item which is referred to in the timing notification function. As mentioned above, owing to the timing notification function, push notification information stored in the storage unit 120 is displayed on the screen of the terminal apparatus 100 in a case where the state of the printer 200 connected to the terminal apparatus 100 satisfies a condition described in the setting item 405. Here, as an example, "In case of issuance of warning of small ink remaining amount" is set. Thus, the set example indicates that, under the condition that the remaining amount of ink which is used in the printer 200 has become small, push notification information is displayed on the screen of the terminal apparatus 100. Furthermore, the setting item 405 does not necessarily need to be set. In a case where the setting item 405 is not set, irrespective of the state of the printer 200, push notification information is displayed on the screen of the terminal apparatus 100. Thus, push notification information is displayed with the immediate notification function A being executed. Details thereof are described below with reference to FIG. 5.

Furthermore, a display condition for a case where a notification is output with the timing notification function differs depending on the content of push notification information. For example, in a case where the content of the setting item 401 is "Ink discount campaign in progress!", the display condition in the setting item 405 described below is "In case of issuance of warning of small ink remaining amount". Moreover, for example, in a case where the content of the setting item 401 is "Please request a repair service from a support center.", the display condition in the setting item 405 described below is "In case of failure occurrence of the printer".

A check box 406 is an item for setting whether to execute the immediate notification function A in a case where, in the terminal apparatus 100, it is impossible to execute the timing notification function.

For example, in a case where a check mark is put to the check box 406, executing the immediate notification function A is assumed to be set. Moreover, in a case where no check mark is put to the check box 406, not executing the immediate notification function A is assumed to be set. For example, in a case where the display condition for push notification information in the setting item 405 is a condition concerning an error such as printer failure, to cause a notification that is based on push notification information to be displayed at the time of failure of the printer, not executing the immediate notification function A is set. Information indicating whether executing the immediate notification function A is set (whether a check mark is put to the check box 406) is caused to be included in push notification information and is thus transmitted to the terminal apparatus 100. Information indicating whether executing the immediate notification function A is set is referred to in determination processing described below with reference to FIG. 6. Furthermore, in a case where the setting item 405 is not set, the check box 406 can be configured to gray out, thus disabling performing setting.

A button 407 is a registration button for registering items set in the setting items 401 to 406.

If the registration button 407 is pressed, push notification information including the set items is stored in the management server 400. Next, delivery processing for delivering push notification information to the terminal apparatus 100 is described. FIG. 3B is a sequence diagram in delivering push notification information to the terminal apparatus 100 in a case where the timing notification function is executed. Furthermore, processing in the present sequence diagram can be performed immediately after setting of push notification information is performed on the dashboard of the management PC illustrated in FIG. 4 or can be performed after a predetermined time elapses after setting of push notification information is performed.

In step S106, the management server 400 performs generation of push notification information such as that illustrated in FIG. 5 based on the setting of push notification information performed on the dashboard of the management PC illustrated in FIG. 4. FIG. 5 is a diagram illustrating push notification information. Thus, FIG. 5 illustrates a command example of push notification information which is generated by the management server 400 based on the content set by the service provider as illustrated in FIG. 4. Here, as an example, the push notification information is described in the JavaScript Object Notation (JSON) format, but can be described in, for example, Extensible Markup Language (XML) as a format which a push notification server requests. In a "message" key, a text of push notification information set in the setting item 401 is set. In a "campaignURL" key, a URL set in the setting item 402 is set. In an "expireDate" key, an expiration date set in the setting item 403 is set. In a "condition" key, a display condition set in the setting item 405 is set. Here, "error_code:InkLow", which represents "In case of issuance of warning of small ink remaining amount", is set. In a "notification_switch" key, information indicating whether the check box 406 is on or off is set.

Furthermore, in a case where the description of a display condition is absent in the "condition" key of the received push notification information, the application 102 determines to execute the immediate notification function A with respect to the push notification information. Moreover, in a case where the description of a display condition is present in the "condition" key, the application 102 determines to execute the timing notification function with respect to the push notification information. Then, in a case where the description of a display condition is present in the "condition" key, the application 102 determines whether the "notification_switch" key is ON or OFF. In a case where the "notification_switch" key is ON, the application 102 causes the immediate notification function A to be executed with respect to the push notification information, and, in a case where the "notification_switch" key is OFF, the application 102 stores the push notification information in the storage unit 120 without causing the immediate notification function A to be executed with respect to the push notification information.

In step S107, the management server 400 determines to deliver the push notification information to a terminal apparatus corresponding to the device token transmitted from the application 102. Here, the management server 400 is assumed to determine to deliver the push notification information to the terminal apparatus 100.

In step S108, the management server 400 transmits the push notification information to the push notification server 300. Additionally, the management server 400 also transmits the device token transmitted from the application 102 to the push notification server 300.

In step S109, the push notification server 300 determines to deliver the push notification information to a terminal apparatus corresponding to the device token transmitted from the management server 400. Here, the push notification server 300 is assumed to determine to deliver the push notification information to the terminal apparatus 100. Then, the push notification server 300 delivers or transmits the push notification information to the terminal apparatus 100.

In step S110, the OS 101 activates the application 102 based on receiving the push notification information. Then, the OS 101 passes the received push notification information to the application 102. Furthermore, the application 102 is activated in the background, and, at this point of time, screen display by the application 102 is not performed.

In step S111, the application 102 performs determination processing for determining whether the terminal apparatus 100 is capable of executing the push notification function using the timing notification function (determination processing for capability or incapability of the push notification function using the timing notification function). Since the present sequence diagram is a sequence diagram illustrating delivery processing to be performed in a case where the push notification function using the timing notification function is performed, in step S111, it becomes determined that the terminal apparatus 100 is capable of executing the push notification function using the timing notification function. Furthermore, the determination processing for capability or incapability of the push notification function using the timing notification function is described below with reference to FIG. 6.

In step S112, the application 102 stores the push notification information passed from the OS 101 in the storage unit 120.

In step S113, the printer management software 103 executes a timing notification function which is described below with reference to FIG. 8.

Next, FIG. 3C is a sequence diagram in delivering push notification information to the terminal apparatus 100 in a case where the immediate notification function A is executed.

Processing operations in steps S114 to S119 are processing operations similar to those in steps S106 to S111 and are, therefore, omitted from description.

Furthermore, since the present sequence diagram is a sequence diagram illustrating delivery processing to be performed in a case where the immediate notification function A is executed, in step S119, it becomes determined that the terminal apparatus 100 is incapable of executing the push notification function using the timing notification function.

In step S120, the application 102 executes the immediate notification function A. Specifically, the application 102 immediately instructs the OS 101 to execute the push notification function, without based on information which is received by the printer management software 103.

Figure 6:
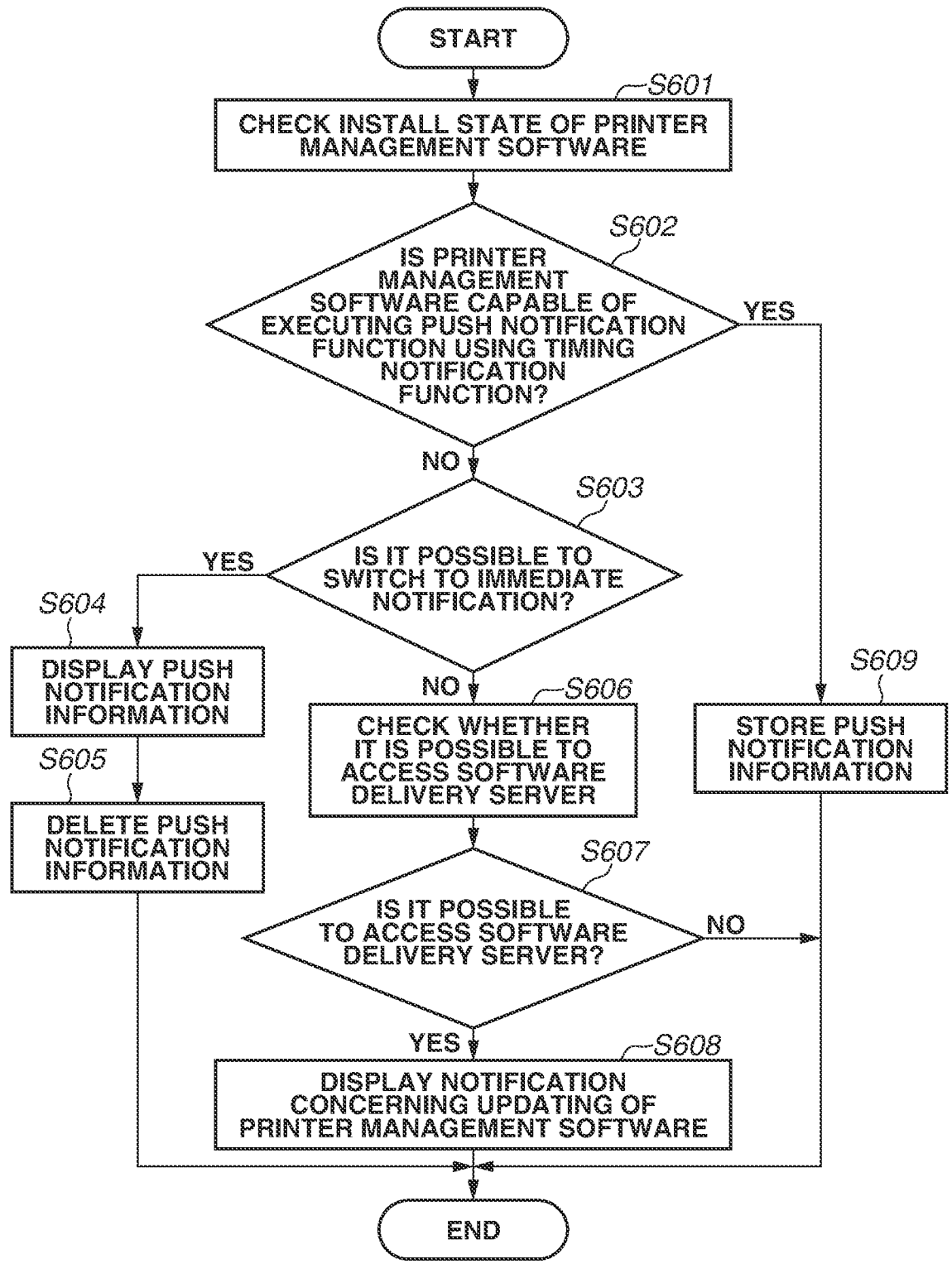
FIG. 6 is a flowchart illustrating processing for determining capability or incapability of a timing notification function.

FIG. 6 is a flowchart illustrating determination processing for capability or incapability of the timing notification function, which corresponds to step S111 or S119 illustrated in FIG. 3B or 3C and thus is processing for determining whether the printer management software 103 is capable of executing the timing notification function. While, in the following description, the application 102 may be assumed to be the subject of each processing, actually, a processor such as the CPU 110 included in the terminal apparatus 100 executes a corresponding program, thus implementing the corresponding function. Furthermore, not all of the processing operations are always sequentially performed on a single process, and there can be a case where processing once proceeds to the OS 101 and is then invoked from the OS 101 again.

The present flowchart merely corresponds to a flow illustrating principal processing for descriptive purposes and in an easily understandable manner. Upon receiving the push notification information passed from the OS 101 in step S110 or S118 illustrated in FIG. 3B or 3C, the application 102 starts determination processing for capability or incapability of the timing notification function illustrated in FIG. 6, which corresponds to step S111 or S119 illustrated in FIG. 3B or 3C.

In step S601, the application 102 checks whether the printer management software 103 is currently installed on the terminal apparatus 100. Specifically, the printer management software 103 writes a value indicating a version of software in a predetermined registry in advance, and the application 102 acquires the value in the registry. Furthermore, in a case where the printer management software 103 is not currently installed, since there is no value in the registry, the application 102 acquires no value in the present processing.

In step S602, the application 102 determines whether the printer management software 103 capable of executing the timing notification function is currently installed, based on a result of the processing in step S601. Furthermore, the present determination is equivalent to the determination as to whether the terminal apparatus 100 is capable of executing the push notification function using the timing notification function. The printer management software 103 capable of executing the timing notification function is assumed to be printer management software 103 of a predetermined version or greater version. Furthermore, in the determination in step S602, specifically, first, the application 102 performs determination A as to whether the printer management software 103 is currently installed on the terminal apparatus 100. If a result of the determination A is YES, additionally, the application 102 performs determination B as to whether the version of the printer management software 103 is a predetermined version or greater version capable of executing the timing notification function. Specifically, the application 102 acquires a value indicating the version of software written in the predetermined registry, and determines whether the acquired value is a value indicating a predetermined version capable of executing the timing notification function. Thus, in a case where the printer management software 103 is currently installed and the version of the printer management software 103 is greater than or equal to the predetermined version, the application 102 determines a result of the present determination as YES. On the other hand, in a case where, while the printer management software 103 is currently installed, the version of the printer management software 103 is less than the predetermined version, the application 102 determines a result of the present determination as NO. Furthermore, the version of the printer management software 103 currently installed is specified by the value acquired in step S601. Moreover, in a case where the printer management software 103 is not currently installed, the application 102 also determines a result of the present determination as NO. Furthermore, while, in the above description, a configuration in which the application 102 performs both the determination A and the determination B has been described, a configuration in which the application 102 performs only one of the determination A and the determination B can be employed. Furthermore, while the application 102 is assumed to previously store information about the predetermined version capable of executing the timing notification function, a configuration in which the application 102 acquires information about the predetermined version capable of executing the timing notification function from, for example, the management server 400 can be employed. If the result of determination in step S602 is YES (YES in step S602), the application 102 advances the processing to step S609, and, if the result of determination in step S602 is NO (NO in step S602), the application 102 advances the processing to step S603.

In step S603, the application 102 determines whether setting for causing the immediate notification function A to be executed in a case where it is impossible to execute the timing notification function is currently performed in the push notification information. Specifically, the application 102 checks the value of "notification_switch" of the push notification information illustrated in FIG. 5, and, if "ON" is set as the value, the application 102 determines that setting for causing the immediate notification function A to be executed in a case where it is impossible to execute the timing notification function is currently performed in the push notification information. If the result of determination in step S603 is YES (YES in step S603), the application 102 advances the processing to step S604, and, if the result of determination in step S603 is NO (NO in step S603), the application 102 advances the processing to step S606. Furthermore, if the result of determination in step S603 is NO, the application 102 stores the push notification information in the storage unit 120.

Figure 7A:
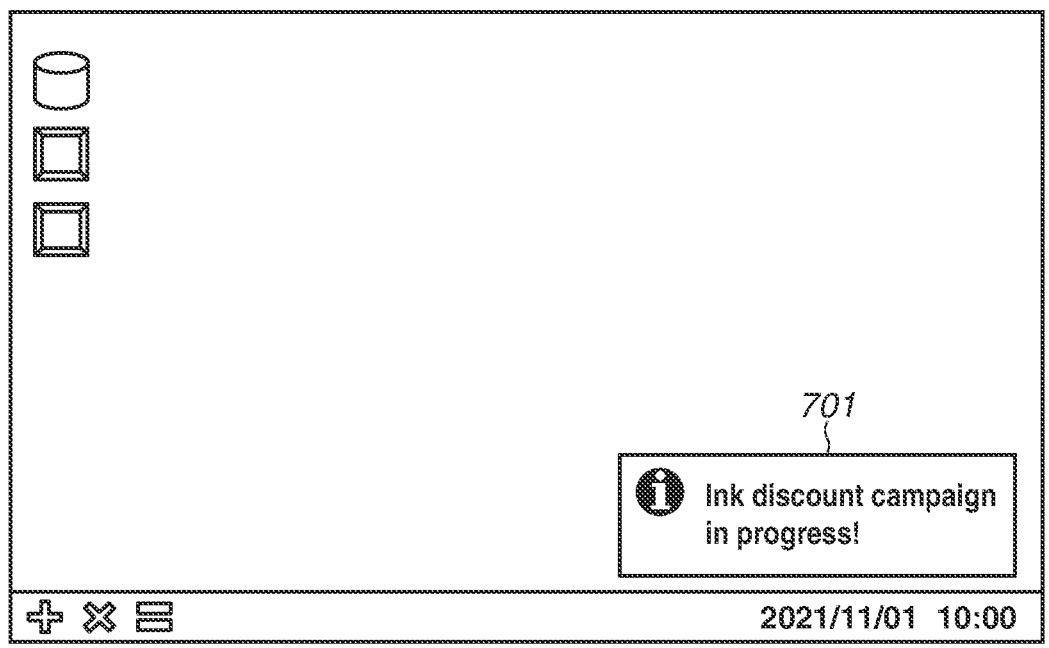
FIGS. 7A and 7B are diagrams illustrating notification screens concerning updating of software.

In step S604, the application 102 executes the immediate notification function A with respect to the push notification information. Specifically, the application 102 issues an instruction to the OS 101 to cause the OS 101 to display the push notification information on the display unit 150 of the terminal apparatus 100. Moreover, unlike the timing notification function, the present processing is performed without based on the status information about the printer 200. This is equivalent to the processing in step S120 illustrated in FIG. 3C. With the present processing, for example, a notification such as a notification 701 illustrated in FIG. 7A is displayed. Furthermore, the notification 701 is a push notification region. Specifically, FIG. 7A illustrates an example of a state in which the desktop screen is displayed on the display unit 150, and the push notification region is popped up at a part of the screen which the display unit 150 is displaying.

In step S605, the application 102 deletes the push notification information displayed in step S604 from the storage unit 120, and then ends the processing in the present flowchart.

In step S606, to which the application 102 advances the processing in the case of NO in step S603, the application 102 checks whether it is possible to perform communication with a software delivery server (not illustrated) via the Internet. Furthermore, the software delivery server is assumed to manage version information about downloadable printer management software 103 and the URL of a download site. Furthermore, the management server 400 can include a function serving as a software delivery server.

In step S607, the application 102 determines whether it is possible to download the latest version of printer management software 103. Specifically, the application 102 determines whether it is possible to perform communication with the software delivery server via the Internet. In a case where it is possible to perform communication with the software delivery server via the Internet, it is determined that it is possible to download the latest version of printer management software 103. If the result of determination in step S607 is YES (YES in step S607), the application 102 advances the processing to step S608, and, if the result of determination in step S607 is NO (NO in step S607), the application 102 ends the processing in the present flowchart. Furthermore, while, if the result of determination in step S607 is NO, the push notification information is kept stored in the storage unit 120, the push notification information is assumed to have an expiration date designated thereon.

The application 102 determines whether the push notification information is currently stored in the storage unit 120 at the time of start-up, and, if it is determined that the push notification information is currently stored, the application 102 checks the expiration date of the push notification information currently stored. Then, if the push notification information has exceeded the expiration date, the application 102 deletes the push notification information from the storage unit 120, and, if the push notification information has not yet exceeded the expiration date, the application 102 performs the processing in the flowchart of FIG. 6 again. With this processing, in a case where it has become possible to download a predetermined version of printer management software 103 capable of executing the timing notification function, it is possible to perform displaying to prompt the user to install the printer management software 103. Additionally, it is possible to prevent the push notification information from being kept stored in the storage unit 120 of the terminal apparatus 100 incapable of executing the timing notification function.

Figure 7B:
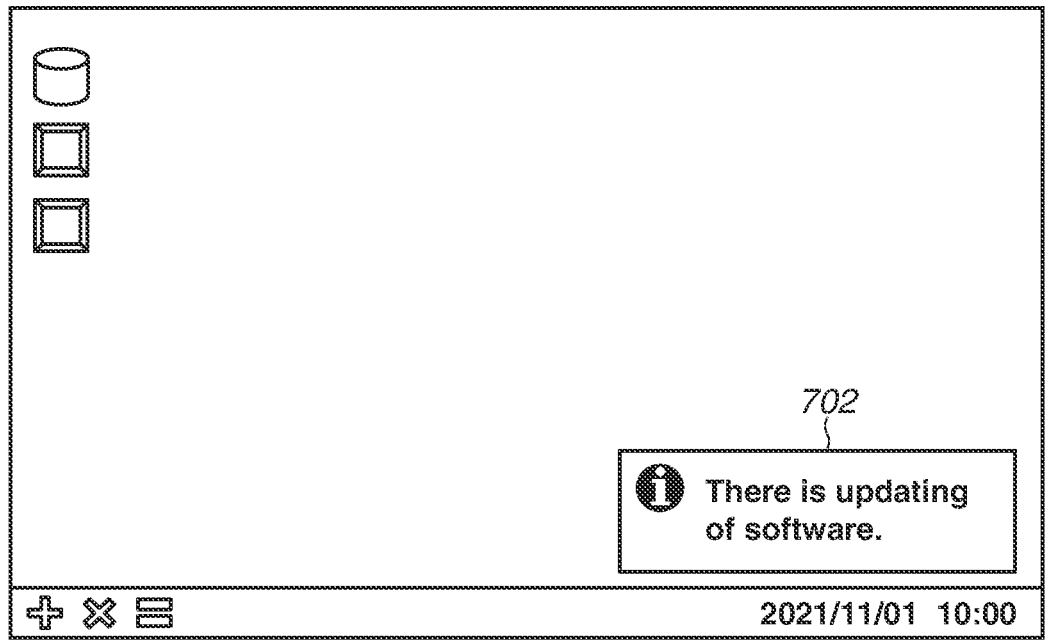

In step S608, the application 102 displays, on the display unit 150, a notification concerning updating or install of software such as a notification 702 illustrated in FIG. 7B. The notification concerning updating or install of software is previously generated by the application 102, and the notification concerning updating or install of software is displayed by the push notification function. Furthermore, the application 102 can communicate with the software delivery server, acquire a notification concerning updating or install of software generated by the software delivery server, and display the notification concerning updating or install of software by the push notification function. The notification concerning updating or install of software is assumed to be immediately displayed by the application 102 or the OS 101, but can be displayed after a predetermined time elapses. Furthermore, with regard to the notification concerning updating or install of software, for example, in a case where the user has clicked the notification such as the notification 702 illustrated in FIG. 7B, the URL of a download site acquired from the software delivery server is opened by the browser. With this processing, it is possible to prompt the user to install the printer management software 103 capable of timing notification. Then, the application 102 ends the processing in the present flowchart.

In step S609, which follows the case of YES in step S602, the application 102 stores the push notification information in the storage unit 120. This is equivalent to the processing in step S112 illustrated in FIG. 3B. Thus, the push notification information stored in the storage unit 120 is used for the printer management software 103 capable of executing the timing notification function to execute the timing notification function.

Furthermore, in the present flowchart, there can be a case where neither the processing in step S606 nor the processing in step S607 is performed.

FIG. 8 is a flowchart illustrating display processing for a notification that is based on push notification information using the timing notification function, which corresponds to step S113 illustrated in FIG. 3B. While, in the following description, the printer management software 103 may be assumed to be the subject of each processing, actually, a processor such as the CPU 110 included in the terminal apparatus 100 executes a corresponding program, thus implementing the corresponding function. Furthermore, not all of the processing operations are always sequentially performed on a single process, and there can be a case where processing once proceeds to the OS 101 and is then invoked from the OS 101 again. The present flowchart merely corresponds to a flow illustrating principal processing for descriptive purposes and in an easily understandable manner. Processing in the present flowchart is periodically started by the printer management software 103.

In step S801, the printer management software 103 transmits, to the printer 200, a transmission request for status information about the printer 200. Here, the status information is information indicating in what state the printer 200 is, such as that illustrated in FIG. 9. For example, if the printer 200 is in the process of printing, a value "Printing" is returned from the printer 200. Moreover, the status information includes detailed status information, and the detailed status information includes, for example, error/warning information. The error/warning information is, as illustrated in FIG. 9, information indicating an error or warning which is occurring in the printer 200. For example, if the printer 200 is in the state of being small in the remaining amount of ink, a value "InkLow" is returned from the printer 200. Therefore, in a case where the printer 200 is in the process of printing and is in the state of being small in the remaining amount of ink, a value "Printing:InkLow" is returned from the printer 200. Furthermore, there is also a case where the status information includes no error/warning information as detailed status information. For example, if the printer 200 is in the process of printing and there is no error/warning information as detailed status information, only a value "Printing" is returned from the printer 200.

In step S802, the printer management software 103 determines whether acquisition of the status information is successful. If the result of determination in step S802 is YES (YES in step S802), the printer management software 103 advances the processing to step S803, and, if the result of determination in step S802 is NO (NO in step S802), the printer management software 103 advances the processing to step S804.

In step S803, the printer management software 103 stores the status information acquired from the printer 200 in the storage unit (memory) 120. Moreover, the application 102 can display the status information acquired from the printer 200 on the display unit 150 of the terminal apparatus 100.

In step S804, the printer management software 103 determines whether there is push notification information stored by the application 102 in the storage unit 120. If it is determined that there is no stored push notification information, the result of determination in step S804 is NO (NO in step S804), and, then, the printer management software 103 ends the processing in the present flowchart. Furthermore, even after ending the processing in the present flowchart, the printer management software 103 can periodically perform the processing in the present flowchart. If it is determined that there is stored push notification information, the result of determination in step S804 is YES (YES in step S804), and, then, the printer management software 103 advances the processing to step S805, thus starting execution of the timing notification function. In the first exemplary embodiment, processing operations in steps S805 to S809 are equivalent to processing in the timing notification function.

In step S805, the printer management software 103 reads out push notification information stored in the storage unit 120.

In step S806, the printer management software 103 determines whether the push notification information is within the expiration date. Specifically, the printer management software 103 makes an acquisition request for date and time information to the OS 101 to acquire the current date and time and determines whether the current date and time is a date and time earlier than "expireDate" written in the push notification information. If the result of determination in step S806 is YES (YES in step S806), the printer management software 103 advances the processing to step S807, and, if the result of determination in step S806 is NO (NO in step S806), the printer management software 103 advances the processing to step S809, in which the printer management software 103 deletes the push notification information and then ends the processing in the present flowchart.

In step S807, the printer management software 103 determines whether the status information about the printer 200 acquired in step S803 satisfies a display condition for push notification information.

Specifically, the printer management software 103 determines whether the status information about the printer 200 read out from the storage unit 120 coincides with (matches) a content written in the "condition" key of push notification information. For example, referring to FIG. 5, "InkLow" is written in the "condition" key of push notification information. Therefore, in a case where "InkLow" is included as error/warning information in the detailed status information of the status information about the printer 200 read out from the storage unit 120, it is determined that the status information about the printer 200 satisfies a display condition for push notification information. Thus, for example, in a case where the value of status information about the printer 200 illustrated in FIG. 9 is "Idle:InkLow" or "Printing:InkLow", it is determined that the status information about the printer 200 satisfies a display condition for push notification information. If the result of determination in step S807 is YES (YES in step S807), the printer management software 103 advances the processing to step S808, and, if the result of determination in step S807 is NO (NO in step S807), the printer management software 103 ends the processing in the present flowchart.

In step S808, the printer management software 103 displays (outputs), on the screen of the terminal apparatus 100, a notification that is based on the push notification information. Specifically, the printer management software 103 instructs the OS 101 to display a notification that is based on the push notification information on the screen of the terminal apparatus 100. With this processing, the OS 101 causes the display unit 150 to display a notification that is based on the push notification information using the push notification function. For example, a notification such as the notification 701 illustrated in FIG. 7A is displayed.

Furthermore, displaying of a notification that is based on the push notification information can be performed by the application 102. Moreover, outputting of a push notification can be performed with sound via the audio output unit 130. Thus, a notification of the content of, for example, a campaign can be issued with sound. Then, in step S809, the printer management software 103 deletes the push notification information, and then ends the processing in the present flowchart.

As described above, in the first exemplary embodiment, the application 102 determines whether the printer management software 103 is currently installed on the terminal apparatus 100. Moreover, the application 102 determines whether the printer management software 103 is compatible with the timing notification function. Then, if it is determined that the printer management software 103 is currently installed on the terminal apparatus 100 and is compatible with the timing notification function, the application 102 causes the timing notification function to be executed. Moreover, if it is determined that the printer management software 103 is not currently installed on the terminal apparatus 100 or if it is determined that the printer management software 103 is not compatible with the timing notification function, the application 102 determines whether the immediate notification function A is currently set in the push notification information. If it is determined that the immediate notification function A for push notification information is currently set in the push notification information, the application 102 causes the OS 101 to execute the immediate notification function A for the received push notification information. With this processing, in a case where the timing notification function is executed, it is possible to provide the push notification information to the user at appropriate timing. Moreover, since, even in a case where the timing notification function is not executed, the immediate notification function A is executed, it is possible to notify the user of a content that is based on the push notification information. Moreover, if it is determined that the immediate notification function A is not currently set in the push notification information, the application 102 causes the OS 101 to display, using the push notification function, a notification for prompting the user to install or update the printer management software 103 for executing the timing notification function. Then, the application 102 stores the push notification information in the storage unit 120. With this processing, since, even in a case where neither the timing notification function nor the immediate notification function A is executed, a notification for prompting the user to install or update the printer management software 103 is issued, the timing notification function becomes increasingly likely to be executed, so that the possibility of being able to notify the user of a content that is based on the push notification information increases.

Furthermore, in the first exemplary embodiment, the application 102 has been described as an application for controlling the printer 200. More specifically, as the application 102, an extended application called a print workflow application in Windows® can be used. The print workflow application is capable of extending the function of a printer driver (for example, extension of print settings or a preview function) by starting and running based on an instruction for printing from the user. Moreover, the application 102 can be an application for notification. Additionally, a configuration in which the functions of the application 102 and the printer management software 103 are executed by a single application program can be employed.

Moreover, in the first exemplary embodiment, a configuration in which, in a case where the application 102 executes the immediate notification function A in step S120 illustrated in FIG. 3C, the application 102 causes a notification that is based on the push notification information to be displayed by the push notification function has been described. However, in a case where the application 102 executes the immediate notification function A, a notification that is based on the push notification information can be displayed not by the push notification function but on a screen of the application 102. Moreover, in a case where the application 102 executes the immediate notification function A, the application 102 can instruct the printer management software 103 to display a notification that is based on the push notification information not by the push notification function but on a screen of the printer management software 103.

Moreover, in the first exemplary embodiment, a configuration in which, in a case where the printer management software 103 executes the timing notification function in step S113 illustrated in FIG. 3B, the printer management software 103 causes a notification that is based on the push notification information to be displayed by the push notification function has been described. However, in a case where the printer management software 103 executes the timing notification function, a notification that is based on the push notification information can be displayed not by the push notification function but on a screen of the printer management software 103. Moreover, in a case where the printer management software 103 executes the timing notification function, the printer management software 103 can instruct the application 102 to display a notification that is based on the push notification information not by the push notification function but on a screen of the application 102.

Additionally, in the first exemplary embodiment, a configuration in which the service provider of a vendor uses the check box 406 illustrated in FIG. 4 to set whether to execute the immediate notification function A in a case where, in the terminal apparatus 100, it is impossible to execute the timing notification function has been described. However, whether to execute the immediate notification function A in a case where, in the terminal apparatus 100, it is impossible to execute the timing notification function can be determined according to status information about the printer 200. For example, the application 102 is assumed to previously determine to, if the value of status information about the printer 200 is "Printing", execute the immediate notification function A in a case where, in the terminal apparatus 100, it is impossible to execute the timing notification function. Therefore, the application 102 can refer to the value of the "condition" key of the push notification information in step S603 illustrated in FIG. 6 and, if the value of the "condition" key is "Printing", determine to execute the immediate notification function A.

In the above-described first exemplary embodiment, with respect to the push notification information generated by the management server 400, the application 102 causes the timing notification function to be executed in a case where the terminal apparatus 100 is capable of executing the timing notification function, and causes the immediate notification function A to be executed in a case where the terminal apparatus 100 is incapable of executing the timing notification function. However, in a second exemplary embodiment, a configuration in which, with respect to the push notification information, the management server 400 determines whether to cause the timing notification function to be executed or to cause the immediate notification function A to be executed and transmits the determined information to the terminal apparatus 100 is described. Furthermore, in the following description, differences from those in the first exemplary embodiment are mainly described.

FIG. 10A is a sequence diagram of the present system. While, in the following description, each apparatus, an application, or an OS may be assumed to be the subject of each processing, actually, a processor such as a CPU included in each apparatus executes a corresponding program, thus implementing the corresponding function. Furthermore, not all of the processing operations are always sequentially performed on a single process, and there can be a case where processing once proceeds to the OS 101 and is then invoked from the OS 101 again. The sequence diagrams merely correspond to a flow illustrating principal processing for descriptive purposes and in an easily understandable manner. Furthermore, to execute the push notification function with respect to the terminal apparatus 100, it is necessary that registration processing for push notification has been performed in advance. FIG. 10A is a sequence diagram of registration processing for registering the terminal apparatus 100, as a terminal apparatus targeted for delivery of push notification information, with the management server 400.

Processing operations in steps S101 to S103 are processing operations similar to those in steps S101 to S103 illustrated in FIG. 3A and are, therefore, omitted from description.

In step S1101, the application 102 determines whether the printer management software 103 is capable of executing the timing notification function. Specifically, the application 102 determines whether a printer management software 103 of a predetermined version or greater version capable of executing the timing notification function is currently installed on the terminal apparatus 100. This processing is processing similar to the processing in step S602 illustrated in FIG. 6 and is, therefore, omitted from detailed description.

In step S1102, the application 102 transmits, to the management server 400, the acquired printer information and device token and information indicating whether the printer management software 103 is capable of executing the timing notification function while associating them with each other. Furthermore, in a case where a plurality of pieces of printer information has been acquired, the application 102 causes the user to select a printer 200 which the user uses from among printers corresponding to the acquired pieces of printer information. For example, the application 102 displays a selection screen for causing the user to select a printer 200 which the user uses. Then, the application 102 transmits, to the management server 400, printer information about the selected printer 200, the device token acquired in step S103, and information indicating whether the printer management software 103 is capable of executing the timing notification function while associating them with each other. Furthermore, the application 102 is assumed to know address information about the management server 400 in advance.

In step S1103, the management server 400 stores the printer information and device token acquired from the application 102 and the information indicating whether the printer management software 103 is capable of executing the timing notification function. Furthermore, the management server 400 stores respective pieces of information while associating them with each other for every application included in each of the respective terminal apparatuses.

Figure 10C:
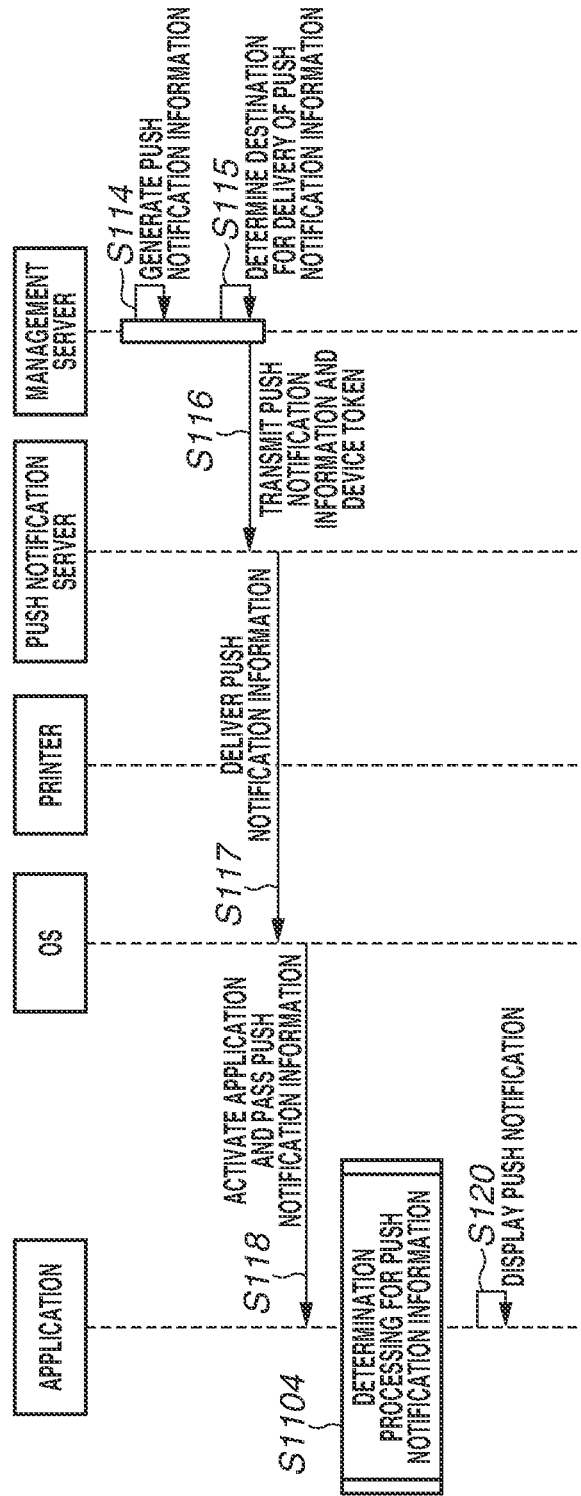

Next, delivery processing for delivering push notification information to the terminal apparatus 100 is described. The push notification information is determined on a dashboard of the management PC provided by the management server 400. FIG. 10B is a sequence diagram in delivering push notification information to the terminal apparatus 100 in a case where the timing notification function is executed. FIG. 10C is a sequence diagram in delivering push notification information to the terminal apparatus 100 in a case where the immediate notification function A is executed.

Processing operations in steps S106 to S110 and step S112 illustrated in FIG. 10B are similar to processing operations in steps S106 to S110 and step S112 illustrated in FIG. 3B. Moreover, processing operations in steps S114 to S118 and step S120 illustrated in FIG. 10C are similar to processing operations in steps S114 to S118 and step S120 illustrated in FIG. 3C. Furthermore, in step S106 or S114, the management server 400 generates, in addition to the push notification information illustrated in FIG. 5, push notification information such as that illustrated in FIG. 11A or 11B. The push notification information illustrated in FIG. 11A is push notification information for causing a terminal apparatus 100 incapable of executing the timing notification function to execute the immediate notification function A. To cause the terminal apparatus 100 to immediately perform notification, there is no value written in the "condition" key. Moreover, in the "expireDate" and "notification_switch" keys, there is no written value. Furthermore, the "message" and "campaignURL" keys are similar to those illustrated in FIG. 5. Moreover, the push notification information illustrated in FIG. 11B is push notification information for prompting the user to install or update the printer management software 103 in a case where the check box 406 in the screen illustrated in FIG. 4 is off. To cause the terminal apparatus 100 to immediately perform notification, there is no value written in the "condition" key. Moreover, in the "expireDate" and "notification_switch" keys, there is no written value. Furthermore, a notification concerning updating or install of software is assumed to be immediately displayed by the application 102 or the OS 101, but can be displayed after a predetermined time elapses. Furthermore, in the "message" key, there is written "There is updating of software." for issuing a notification of updating of the printer management software 103. Moreover, in the "campaignURL" key, there is written "https://www.hegehogexxx.com/download/software.html", which is the URL of a download site for software. Furthermore, in the second exemplary embodiment, the management server 400 is assumed to also manage information about the URL of a download site for the printer management software 103. However, a software delivery server (not illustrated) can manage the URL of the download site and the management server 400 can communicate with the software delivery server to acquire information about the URL.

Furthermore, in the second exemplary embodiment, push notification information in which there is a value written in the "condition" key, such as the push notification information illustrated in FIG. 5, is set as push notification information for causing the timing notification function to be executed with respect to push notification information.

Figure 12:
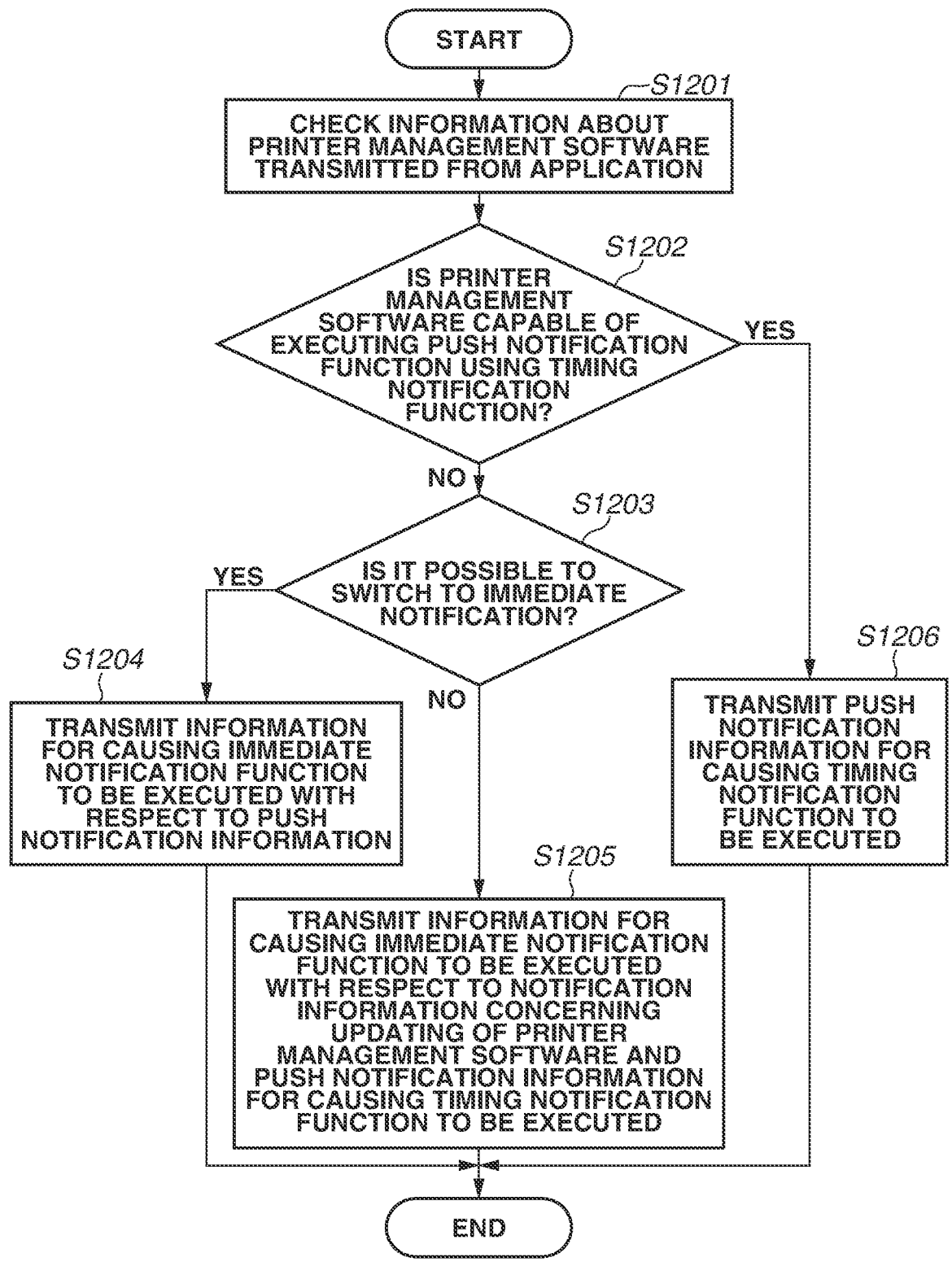
FIG. 12 is a flowchart illustrating processing for determining push notification information corresponding to a communication apparatus serving as a delivery destination.

Here, FIG. 12 is a flowchart illustrating processing in which the management server 400 determines to which terminal apparatus to deliver what push notification information in step S107 illustrated in FIG. 10B or step S115 illustrated in FIG. 10C. Here, the processing is performed to determine push notification information to be transmitted to the terminal apparatus 100. Furthermore, the processing in the flowchart of FIG. 12 is started in a case where the printer information and device token and the information indicating whether the printer management software 103 is capable of executing the timing notification function have been stored in step S1103 illustrated in FIG. 10A.

In step S1201, the management server 400 checks information indicating whether the printer management software 103 capable of executing the timing notification function is currently installed on the terminal apparatus 100, based on information acquired from the application 102.

In step S1202, the management server 400 determines whether the printer management software 103 capable of executing the timing notification function is currently installed. In a case where the printer management software 103 capable of executing the timing notification function is currently installed, such printer management software 103 is assumed to be a predetermined version or greater version of software. If the result of determination in step S1202 is YES (YES in step S1202), the management server 400 advances the processing to step S1206, and, if the result of determination in step S1202 is NO (NO in step S1202), the management server 400 advances the processing to step S1203.

In step S1203, the management server 400 determines whether setting for causing the immediate notification function A to be executed in a case where it is impossible to execute the timing notification function is currently performed in the push notification information. Specifically, the management server 400 checks a check box of the setting portion 406 for push notification information illustrated in FIG. 4, and, in a case where a check mark is put to the check box, the management server 400 determines that setting for causing the immediate notification function A to be executed in a case where it is impossible to execute the timing notification function is currently performed in the push notification information. If the result of determination in step S1203 is YES (YES in step S1203), the management server 400 advances the processing to step S1204, and, if the result of determination in step S1203 is NO (NO in step S1203), the management server 400 advances the processing to step S1205.

In step S1204, the management server 400 transmits push notification information for causing the immediate notification function A to be executed with respect to the push notification information to the terminal apparatus 100 via the push notification server 300. Specifically, the management server 400 transmits push notification information such as that illustrated in FIG. 11A to the push notification server 300. This is performed in processing in step S116 illustrated in FIG. 10C. Then, the management server 400 ends the processing in the present flowchart.

In step S1205, to which the management server 400 advances the processing if the result of determination in step S1203 is NO, the management server 400 transmits, to the terminal apparatus 100 via the push notification server 300, push notification information for causing the timing notification function to be executed with respect to the push notification information and push notification information for causing push notification information for prompting the user to install or update the printer management software 103 to be displayed. Specifically, the management server 400 transmits the push notification information illustrated in FIG. 5 and the push notification information illustrated in FIG. 11B to the push notification server 300. This is performed in processing in step S108 illustrated in FIG. 10B. Then, the management server 400 ends the processing in the present flowchart.

In step S1206, to which the management server 400 advances the processing if the result of determination in step S1202 is YES, the management server 400 transmits, to the push notification server 300, push notification information for causing the timing notification function to be executed with respect to the push notification information. Specifically, the management server 400 transmits the push notification information illustrated in FIG. 5 to the terminal apparatus 100 via the push notification server 300. This is performed in processing in step S108 illustrated in FIG. 10B. Then, the management server 400 ends the processing in the present flowchart.

FIG. 13 is a flowchart illustrating determination processing for push notification information, which is performed by the application 102 to determine in what way information for causing notification to be performed the push notification information transmitted from the management server 400 is. The flowchart of FIG. 13 is processing corresponding to step S1104 illustrated in FIG. 10B or 10C. While, in the following description, the application 102 may be assumed to be the subject of each processing, actually, a processor such as the CPU 110 included in the terminal apparatus 100 executes a corresponding program, thus implementing the corresponding function. Furthermore, not all of the processing operations are always sequentially performed on a single process, and there can be a case where processing once proceeds to the OS 101 and is then invoked from the OS 101 again. The present flowchart merely corresponds to a flow illustrating principal processing for descriptive purposes and in an easily understandable manner. Upon receiving the push notification information passed from the OS 101 in step S110 or S118 illustrated in FIG. 10B or 10C, the application 102 starts determination processing for push notification information illustrated in FIG. 13, which corresponds to step S1104 illustrated in FIG. 10B or 10C.

In step S1301, the application 102 checks the push notification information acquired from the management server 400.

In step S1302, the application 102 determines whether the push notification information is information for causing the timing notification function to be executed with respect to the push notification information. Specifically, in a case where there is a value written in the "condition" key such as the push notification information illustrated in FIG. 5, the application 102 determines that the push notification information is information for causing the timing notification function to be executed. If the result of determination in step S1302 is YES (YES in step S1302), the application 102 advances the processing to step S1303, and, if the result of determination in step S1302 is NO (NO in step S1302), the application 102 advances the processing to step S1304.

In step S1303, the application 102 stores, in the storage unit 120, push notification information for causing the timing notification function to be executed with respect to the push notification information. Specifically, upon receiving the push notification information such as that illustrated in FIG. 5, the application 102 stores such push notification information in the storage unit 120. This is equivalent to processing in step S112 illustrated in FIG. 10B. Thus, with respect to the push notification information stored in the storage unit 120, as a result, the timing notification function is executed by the printer management software 103 capable of executing the timing notification function. Then, the application 102 ends the processing in the present flowchart.

In step S1304, to which the application 102 advances the processing if the result of determination in step S1302 is NO, the application 102 determines whether push notification information for causing push notification information for prompting the user to install or update the printer management software 103 to be displayed has been acquired. Specifically, in a case where there is no value written in the "condition" key, such as the push notification information illustrated in FIG. 11B, the application 102 determines that the acquired push notification information is information for causing the immediate notification function A to be executed. Moreover, in a case where "There is updating of software." for issuing a notification of updating of the printer management software 103 is written in the "message" key and the URL of a download site for software is written in the "campaignURL" key, the application 102 determines that the acquired push notification information is push notification information for prompting the user to install or update the printer management software 103. If the result of determination in step S1304 is YES (YES in step S1304), the application 102 advances the processing to step S1305, and, if the result of determination in step S1304 is NO (NO in step S1304), the application 102 advances the processing to step S1306.

In step S1305, the application 102 displays, on the display unit 150, a notification concerning updating of software such as a notification 702 illustrated in FIG. 7B. For example, in a case where the user has clicked the notification such as the notification 702 illustrated in FIG. 7B, the URL of a download site acquired from the software delivery server is opened by the browser. With this processing, it is possible to prompt the user to install the printer management software 103 capable of timing notification. Moreover, upon receiving push notification information for causing the timing notification function to be executed with respect to the push notification information, the application 102 stores such push notification information in the storage unit 120. Specifically, when acquiring push notification information such as that illustrated in FIG. 5, the application 102 stores such push notification information in the storage unit 120. This is equivalent to processing in step S112 illustrated in FIG. 10B. Then, the application 102 ends the processing in the present flowchart.

In step S1306, the application 102 executes the immediate notification function A with respect to the push notification information. Specifically, the application 102 displays the push notification information on the display unit 150 of the terminal apparatus 100. Furthermore, with regard to the push notification information for causing the immediate notification function A to be executed, there is no value written in the "condition" key, such as the push notification information illustrated in FIG. 11A. This is equivalent to processing in step S120 illustrated in FIG. 10C. Then, the application 102 ends the processing in the present flowchart.

Furthermore, even in the second exemplary embodiment, in step S113, the flowchart of display processing for timing notification illustrated in FIG. 8 is performed based on the push notification information being stored in the storage unit 120 in step S112 illustrated in FIG. 10B.

As described above, in the second exemplary embodiment, the application 102 determines whether the printer management software 103 compatible with the timing notification function is currently installed on the terminal apparatus 100, and transmits information indicating a result of such determination to the management server 400. Then, in a case where it is determined that the printer management software 103 compatible with the timing notification function is currently installed on the terminal apparatus 100, based on the information acquired from the application 102, the management server 400 generates push notification information for causing the timing notification function to be executed and then transmits the generated push notification information to the terminal apparatus 100. Moreover, the management server 400 determines whether the immediate notification function A is currently set in the push notification information, and, when determining that the immediate notification function A is currently set, the management server 400 generates push notification information for causing the terminal apparatus 100 incapable of executing the timing notification function to execute the immediate notification function A and then transmits the generated push notification information to the terminal apparatus 100. With this processing, in a case where the timing notification function is executed, it is possible to provide the push notification information to the user at appropriate timing. Moreover, since, even in a case where the timing notification function is not executed, the immediate notification function A is executed, it is possible to notify the user of a content that is based on the push notification information. Additionally, in a case where the immediate notification function A is not currently set in the push notification information, the management server 400 transmits, to the terminal apparatus 100, push notification information for causing a content that is based on notification information for prompting the user to install or update the printer management software 103 to be displayed. At this time, the management server 400 also transmits push notification information for causing the timing notification function to be executed to the terminal apparatus 100. With this processing, since, even in a case where neither the timing notification function nor the immediate notification function A is executed, a notification for prompting the user to install or update the printer management software 103 is issued, the timing notification function becomes increasingly likely to be executed, so that the possibility of being able to notify the user of a content that is based on the push notification information increases.

Furthermore, in the second exemplary embodiment, the management server 400 transmits any one of previously generated pieces of push notification information to the terminal apparatus 100 based on information acquired from the application 102 in step S1103 illustrated in FIG. 10A. However, a configuration in which the management server 400 previously determines a terminal apparatus 100 serving as a delivery destination, generates only any corresponding push notification information based on information acquired from the application 102 of the terminal apparatus 100 serving as a delivery destination, and transmits the generated push notification information to the terminal apparatus 100 can be employed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-181101, filed Nov. 5, 2021, which is hereby incorporated by reference herein in its entirety.

What is claimed is:

1. A non-transitory computable-readable storage medium storing one or more programs including instructions, which when executed by one or more processors of an information processing apparatus, cause the one or more processors to perform:
    an acquisition step of acquiring notification information;
    a first execution step of acquiring information about a communication apparatus capable of communicating with the information processing apparatus and, based on the information processing apparatus being capable of executing a timing notification function, causing the information processing apparatus to execute the timing notification function based on the notification information; and
    a second execution step of, based on the information processing apparatus being incapable of executing the timing notification function, causing the information processing apparatus to output a notification based on the notification information,
    wherein the timing notification function is a function of determining whether the information about the communication apparatus satisfies an output condition corresponding to information included in the notification information and, based on a determination result that the information about the communication apparatus satisfies the output condition, causing a notification that is based on the notification information to be output.

2. The non-transitory computable-readable storage medium according to claim 1, wherein the instructions, when executed by the one or more processors, further cause the one or more processors to perform a determination step of determining whether the information processing apparatus is capable of executing the timing notification function, and, in the determination step, in a case where it is determined that the information processing apparatus is capable of executing the timing notification function, the information processing apparatus is caused to execute the timing notification function and, in a case where it is determined that the information processing apparatus is incapable of executing the timing notification function, a notification that is based on the notification information is output.

3. The non-transitory computable-readable storage medium according to claim 2, wherein, in the determination step, at least one determination out of a determination as to whether software for executing the timing notification function is currently installed on the information processing apparatus and a determination as to whether a predetermined version or greater version of software capable of executing the timing notification function is currently installed on the information processing apparatus is performed.

4. The non-transitory computable-readable storage medium according to claim 2, wherein, in the determination step, both a determination as to whether software for executing the timing notification function is currently installed on the information processing apparatus and a determination as to whether a predetermined version or greater version of software capable of executing the timing notification function is currently installed on the information processing apparatus are performed.

5. The non-transitory computable-readable storage medium according to claim 2, wherein, in the determination step, one determination out of a determination as to whether software for executing the timing notification function is currently installed on the information processing apparatus and a determination as to whether a predetermined version or greater version of software capable of executing the timing notification function is currently installed on the information processing apparatus is performed.

6. The non-transitory computable-readable storage medium according to claim 1, wherein software for executing the timing notification function acquires the information about the communication apparatus.

7. The non-transitory computable-readable storage medium according to claim 1, wherein software for executing the timing notification function is a status monitor.

8. The non-transitory computable-readable storage medium according to claim 1, wherein the notification information is transmitted from an external server.

9. The non-transitory computable-readable storage medium according to claim 1, wherein the instructions, when executed by the one or more processors, further cause the one or more processors to perform a determination step of determining, based on the information processing apparatus being incapable of executing the timing notification function, whether information indicating causing the information processing apparatus to output the notification based on the notification information is included in the notification information.

10. The non-transitory computable-readable storage medium according to claim 9, wherein, in a case where, in the determination step, it is determined, based on the information processing apparatus being incapable of executing the timing notification function, that the information indicating causing the information processing apparatus to output the notification based on the notification information is included in the notification information, the notification that is based on the notification information is output.

11. The non-transitory computable-readable storage medium according to claim 9, wherein, in a case where, in the determination step, it is determined, based on the information processing apparatus being incapable of executing the timing notification function, that the information indicating causing the information processing apparatus to output the notification based on the notification information is not included in the notification information, a notification for downloading a predetermined version or greater version of software capable of executing the timing notification function is output.

12. The non-transitory computable-readable storage medium according to claim 9, wherein, in a case where, in the determination step, it is determined that information indicating that a notification that is based on the notification information is output is not included in the notification information, the notification information is stored in a predetermined memory included in the information processing apparatus.

13. The non-transitory computable-readable storage medium according to claim 1, wherein the instructions, when executed by the one or more processors, further cause the one or more processors to perform a transmission step of transmitting information indicating whether the information processing apparatus is capable of executing the timing notification function to a server, and, in a case where the notification information acquired from the server is notification information for causing the information processing apparatus to execute the timing notification function, the information processing apparatus is caused to execute the timing notification function.

14. The non-transitory computable-readable storage medium according to claim 13, wherein, in a case where the notification information acquired from the server is information indicating outputting a notification that is based on the notification information, a notification that is based on the notification information is output.

15. The non-transitory computable-readable storage medium according to claim 13, wherein, in a case where the notification information acquired from the server is notification information for causing a predetermined version or greater version of software capable of executing the timing notification function to be downloaded, a notification for causing the predetermined version or greater version of software capable of executing the timing notification function is output.

16. The non-transitory computable-readable storage medium according to claim 13, wherein, in a case where the information processing apparatus is capable of executing the timing notification function, the notification information generated by the server is stored in a predetermined memory included in the information processing apparatus.

17. The non-transitory computable-readable storage medium according to claim 1, wherein a notification that is based on the notification information is caused to be output to an operating system.

18. The non-transitory computable-readable storage medium according to claim 1, wherein the notification is output from screen displaying of the information processing apparatus.

19. An information processing apparatus comprising:
an acquisition unit configured to acquire notification information;
a first execution unit configured to acquire information about a communication apparatus capable of communicating with the information processing apparatus and, based on the information processing apparatus being capable of executing a timing notification function, cause the information processing apparatus to execute the timing notification function based on the notification information; and
a second execution unit configured to, based on the information processing apparatus being incapable of executing the timing notification function, cause the information processing apparatus to output a notification based on the notification information,
wherein the timing notification function is a function of determining whether the information about the communication apparatus satisfies an output condition corresponding to information included in the notification information and, based on a determination result that the information about the communication apparatus satisfies the output condition, causing a notification that is based on the notification information to be output.

20. A control method for an information processing apparatus, the control method comprising:
acquiring notification information;
acquiring information about a communication apparatus capable of communicating with the information processing apparatus and, based on the information processing apparatus being capable of executing a timing notification function, causing the information processing apparatus to execute the timing notification function based on the notification information; and
based on the information processing apparatus being incapable of executing the timing notification function, causing the information processing apparatus to output a notification based on the notification information,
wherein the timing notification function is a function of determining whether the information about the communication apparatus satisfies an output condition corresponding to information included in the notification information and, based on a determination result that the information about the communication apparatus satisfies the output condition, causing a notification that is based on the notification information to be output.

* * * * *